(12) United States Patent
Han

(10) Patent No.: US 9,001,504 B2
(45) Date of Patent: Apr. 7, 2015

(54) MOVEABLE DISPLAY PORTION OF A COMPUTING DEVICE

(75) Inventor: Amy Han, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 184 days.

(21) Appl. No.: 12/979,588

(22) Filed: Dec. 28, 2010

(65) Prior Publication Data

US 2012/0162889 A1 Jun. 28, 2012

(51) Int. Cl.
*G06F 1/16* (2006.01)

(52) U.S. Cl.
CPC .............. *G06F 1/162* (2013.01); *G06F 1/1624* (2013.01); *G06F 1/1677* (2013.01)

(58) Field of Classification Search
CPC ...... G06F 1/162; G06F 1/1677; G06F 1/1624
USPC .................... 361/679.09, 679.27, 679.39, 727
See application file for complete search history.

(56) References Cited

U.S. PATENT DOCUMENTS

| | | | |
|---|---|---|---|
| 5,229,757 A | 7/1993 | Takamiya et al. | |
| 5,548,478 A * | 8/1996 | Kumar et al. | 361/679.27 |
| 5,708,561 A | 1/1998 | Huilgol et al. | |
| 5,805,415 A | 9/1998 | Tran et al. | |
| 6,392,877 B1 | 5/2002 | Iredale | |
| 6,404,622 B1 | 6/2002 | Chen | |
| 6,483,445 B1 * | 11/2002 | England | 341/22 |
| 6,522,529 B1 | 2/2003 | Huilgol et al. | |
| 6,751,090 B1 | 6/2004 | Yang | |
| 6,816,365 B2 | 11/2004 | Hill et al. | |
| 6,842,338 B2 | 1/2005 | Iredale | |
| 6,850,226 B2 * | 2/2005 | Finke-Anlauff | 345/169 |
| 6,903,927 B2 * | 6/2005 | Anlauff | 361/679.28 |
| 7,092,246 B2 | 8/2006 | Tanaka et al. | |
| 7,107,084 B2 | 9/2006 | Duarte et al. | |
| 7,129,931 B2 | 10/2006 | Pappas | |
| 7,215,538 B1 | 5/2007 | Chen et al. | |
| 7,646,593 B2 | 1/2010 | Smejkalova | |
| 7,679,890 B2 | 3/2010 | Yang | |
| 7,755,904 B2 | 7/2010 | Wu et al. | |
| 2004/0174666 A1 * | 9/2004 | Brandenberg et al. | 361/680 |
| 2005/0041381 A1 * | 2/2005 | Maskatia et al. | 361/683 |
| 2005/0122318 A1 | 6/2005 | Tonouchi et al. | |
| 2006/0267947 A1 | 11/2006 | Nishiyama et al. | |

(Continued)

FOREIGN PATENT DOCUMENTS

| | | |
|---|---|---|
| EP | 1916826 A | 4/2008 |
| WO | 9603685 A1 | 2/1996 |

OTHER PUBLICATIONS

Search Report and Written Opinion for International Application No. PCT/US2011/066182, mailed Mar. 8, 2012, 19 pages.

(Continued)

*Primary Examiner* — Jayprakash N Gandhi
*Assistant Examiner* — Mukund G Patel
(74) *Attorney, Agent, or Firm* — Brake Hughes Bellermann LLP

(57) ABSTRACT

In one general aspect, a computing device can include a base portion including a keyboard, and a guide included in the base portion. The computing device can also include a display portion including a display and having a bottom portion coupled to the base portion via a hinge. The display portion can be configured to rotate about an axis using the hinge. The bottom portion of the display portion can be configured to slidably move along the guide over the keyboard of the base portion in a translational direction orthogonal to the axis.

23 Claims, 14 Drawing Sheets

(56) References Cited

U.S. PATENT DOCUMENTS

2008/0180892 A1* 7/2008 Lai ............................... 361/680
2008/0238816 A1* 10/2008 Matsushita ..................... 345/30
2010/0295426 A1* 11/2010 Zhu et al. ................... 312/223.1

OTHER PUBLICATIONS

International Preliminary Report on Patentability for International Application No. PCT/US2011/066182, mailed Jul. 11, 2013, 10 pages.

* cited by examiner

350

Input Devices 370

| Computing Device Configurations 360 | Keyboard 372 | Electrostatic Touchpad Device 374 | Touch Screen Display 376 |
|---|---|---|---|
| Easel | OFF | OFF | ON |
| Laptop1 | ON | ON | ON |
| Laptop2 | ON | ON | OFF |
| Tablet | OFF | OFF | ON |
| Closed | OFF | OFF | OFF |
| Partial Tablet | OFF | ON | ON |

MOVEABLE DISPLAY PORTION OF A COMPUTING DEVICE

TECHNICAL FIELD

This description relates to a moveable display portion of a computing device.

BACKGROUND

Many known computing devices can have several mechanisms through which a user may interact with (e.g., trigger) one or more functions of the computing device. For example, user input devices such as keyboards, mouse devices, touch screen displays and/or so forth, through which a user may interact with computing devices to perform one or more computing functions, can be connected with and/or integrated into the computing devices. However, these user input devices may be cumbersome to use and/or may not produce results at a desirable speed, level of accuracy, and/or with a desired effect.

SUMMARY

In one general aspect, a computing device can include a base portion including a keyboard, and a guide included in the base portion. The computing device can also include a display portion including a display and having a bottom portion coupled to the base portion via a hinge. The display portion can be configured to rotate about an axis using the hinge. The bottom portion of the display portion can be configured to slidably move along the guide over the keyboard of the base portion in a translational direction orthogonal to the axis.

In another general aspect, a method can include determining that a computing device has been moved from a laptop configuration to a tablet configuration. The computing device can have a display portion with a viewable surface non-parallel to a plane aligned along a base portion of the computing device when the computing device is in the laptop configuration. The display portion of the computing device can have a bottom portion distal to the input device region when the computing device is in the laptop configuration. The bottom portion of the display portion can be proximal to the input device region and the viewable surface can be parallel to the plane aligned along the base portion of the computing device when the computing device is in the tablet configuration. The method can also include changing an activation state of an input device included in the input device region in response to the computing device changing from the laptop configuration to the tablet configuration.

In yet another general aspect, a computing device can include a base portion including a keyboard, and a display portion operably coupled to the base portion and including a display. The display can include a viewable surface facing in a first direction away from the base portion when the computing device is in a tablet configuration with a primary plane of the display portion being substantially parallel to a primary plane of the base portion. The display portion can be configured to cover the keyboard when the computing device is in the tablet configuration. The viewable surface of the display can face in a second direction towards the base portion when the computing device is in a closed configuration with a primary plane of the display portion being substantially parallel to a primary plane of the base portion. The display portion can be configured to cover the keyboard when the computing device is in the closed configuration.

The details of one or more implementations are set forth in the accompanying drawings and the description below. Other features will be apparent from the description and drawings, and from the claims.

DETAILED DESCRIPTION

Figure 1:
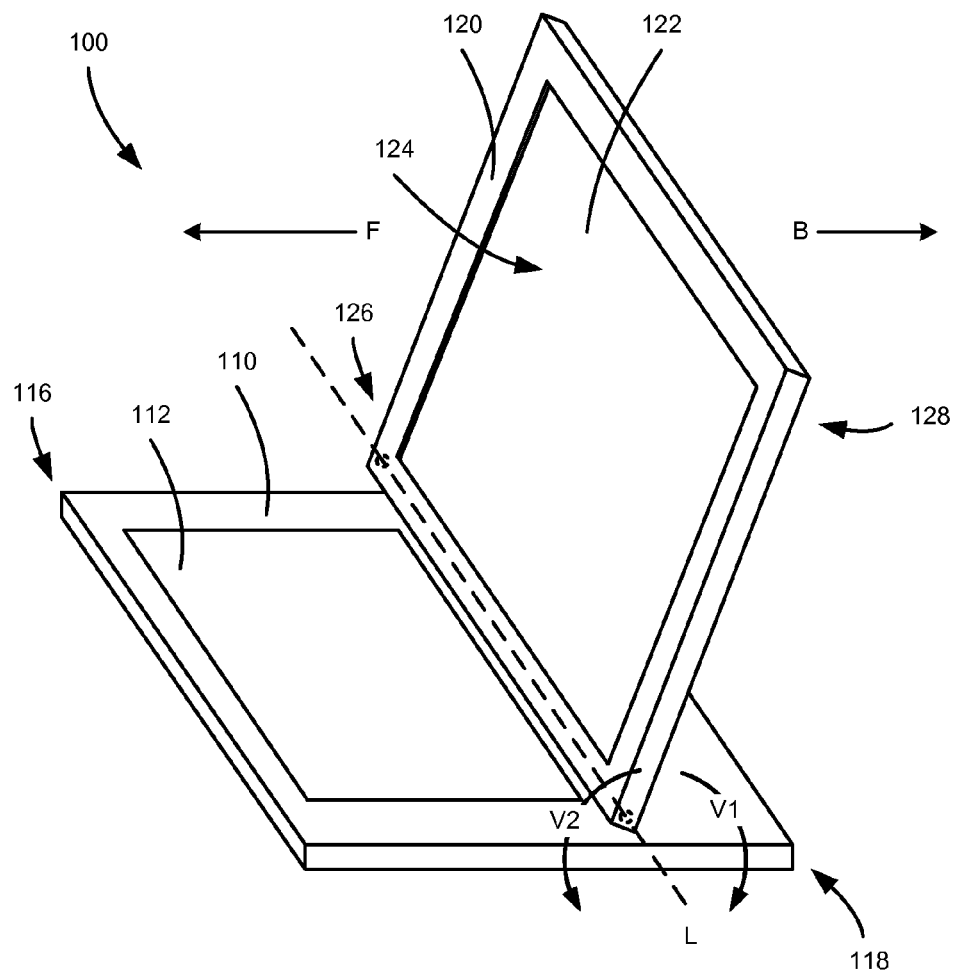
FIG. 1 is a diagram of a computing device with a display portion configured to move with respect to a base portion.

FIG. 1 is a diagram of a computing device 100 including a base portion 110 and a display portion 120. As shown in FIG. 1, the display portion 120 includes a display 122, and the base portion 110 includes an input device region 112. The display 122 can have a display surface 124 (also can be referred to as a viewable surface) upon which illuminated objects can be displayed and viewed by a user. The input device region 112 can include various types of input devices such as, for example, a keyboard, one or more buttons, an electrostatic touchpad to control a mouse cursor, etc.

In this embodiment, the display 122 is a touch sensitive display that can be any type of touch sensitive display. In some embodiments, the display 122 can be, or can include, for example, an electrostatic touch device, a resistive touch-screen device, a surface acoustic wave (SAW) device, a capacitive touchscreen device, a pressure sensitive device, a surface capacitive device, a projected capacitive touch (PCT) device, and/or so forth. As a touch sensitive device, the display 122 can function as an input device. For example, the display 122 can be configured to display a virtual keyboard (e.g., emulate a keyboard) that can be used by a user as an input device.

As shown in FIG. 1, the display portion 120 has a bottom portion 126 operably coupled to the base portion 110. The display portion 120 also has a top portion 128 on an end of the display portion 120 that is opposite the bottom portion 126. The base portion 110 has a front portion at a front end 116, and has a back portion at a back end 118 of the base portion 110 of the base portion 110. In this embodiment, a distal direction is towards the back end 118 of the base portion 110, and a proximal direction is towards the front end 116 of the base portion 110. Accordingly, the front end 116 can also be referred to as a proximal end of the base portion 110, and the back end 116 can be referred to as a distal end of the base portion 110.

The display portion 120 is configured to rotate and translate with respect to the base portion 110 in various configurations so that the display 122 and input devices included in the input device region 112 can be used differently in the various configurations. For example, the display portion 120 can be configured to rotate and translate from the configuration shown in FIG. 1 (in which the computing device 100 can be used in a fashion similar to a typical laptop computer) to a configuration where the display portion 120 covers one or more input devices included in the input device 112 of the base portion 110 while the display 122 is facing away from the base portion 110 so that the computing device 100 can be used as a tablet-type computing device. More details related to various configurations of the computing device 100 are described below in connection with FIG. 1 as well as the remaining figures.

As shown in FIG. 1, the display portion 120 is configured to rotate about an axis L of the bottom portion 126 of the display portion 120. Specifically, the display portion 120 is configured to rotate about the axis L in a clockwise direction V1 or in a counterclockwise direction V2 as shown in FIG. 1. Thus, the display portion 120 can be configured to rotate between various rotational positions about the axis L.

In this embodiment, the display portion 120 can be configured to rotate in the clockwise direction V1 until the display portion 120 is parallel to the base portion 110 (or substantially parallel) and the display surface 124 is facing away from the base portion 110. Said differently, the display portion 120 can be configured to rotate in the clockwise correction V1 until the display portion 120 is flat with respect to the base portion 110. Thus, the display portion 120 and the base portion 110 can be aligned along a common plane (or different planes that are parallel (or substantially parallel) to one another) with the display surface 124 facing away from the base portion 110. In some embodiments, when the display portion 120 is positioned such that a plane (e.g., a primary plane) along which the display portion (e.g., a viewable surface of the display portion) is aligned is substantially parallel to a plane (e.g., a primary plane) along which the base portion 110 (e.g., a bottom or top of the base portion 110) is aligned, the computing device 200 can be referred to as being in a tablet configuration. When the computing device 200 is in the tablet configuration, the display surface 124 can be accessible by a user. In some embodiments, the tablet configuration can be characterized as a type of closed configuration because the display portion 120 and the base portion 110 are substantially aligned along a common plane. In some embodiments, when the computing device 100 is in the tablet configuration, at least a portion of the input device region 112 may not be accessible by a user of the computing device 100.

Also, the display portion 120 can be configured to rotate in the counterclockwise direction V2 until the display portion 120 is parallel to the base portion 110 (or substantially parallel) with the display surface 124 facing towards the base portion 110. Said differently, the display portion 120 can be configured to rotate in the counterclockwise correction V2 until the display portion 120 is flat with respect to the base portion 110. Thus, the display portion 120 and the base portion 110 can be aligned along a common plane (or different planes that are parallel (or substantially parallel) to one another) with the display surface 124 facing towards the base portion 110. In some embodiments, when the display portion 120 is in the rotational position described above, the computing device 200 can be referred to as being in a closed configuration (or a closed configuration with display down). In some embodiments, when the computing device 100 is in the closed configuration, at least a portion of the input device region 112 may not be accessible by a user of the computing device 100.

As shown in FIG. 1, the display portion 120 is also configured to translate with respect to the base portion 110 in a translational direction. Specifically, as the display portion 120 is positioned in FIG. 1, the display portion 120 can be configured to translate in a forward direction (direction F) (i.e., a proximal direction) with respect to the base portion 110 towards the front end 116 of the base portion 110, and can be configured to translate in a backward direction (direction B) (i.e., a distal direction) with respect to the base portion 110 towards the back end 118 of the base portion 110. Thus, the display portion 120 can be configured to move between various translational positions along the base portion 110. As shown in FIG. 1, the forward direction and the backward direction, which can be characterized as translational directions, are orthogonal to (e.g., substantially orthogonal to) the axis L.

In the embodiment shown in FIG. 1, the display portion 120 is configured to rotate about the axis L when the display portion 120 is in any translational position with respect to the base portion 110. For example, the display portion 120 can be configured to rotate about the axis L in the clockwise direction V1 or the counterclockwise direction V2 when the display portion 120 is at a first translational position where the display portion 120 is disposed over the front portion of the base portion 110. The display portion 120 can also be configured to rotate about the axis L in the clockwise direction V1 or the counterclockwise direction V2 when the display portion 120 is at a second translational position where the display portion 120 is disposed over the back portion of the base portion 110.

In some embodiments, the computing device 100 may be configured so that the display portion 120 may not be configured to rotate about the axis L when the display portion 120 is in an arbitrary translational position with respect to the base portion 110. For example, the computing device 100 may be configured so that the display portion 120 may rotate about the axis L when the display portion 120 is disposed distal to the input device region 112 and when the display portion 120 is proximal to the input device region 112, but not when the display portion 120 is disposed over the input device region 112 (or specified portion thereof).

In some embodiments, the display portion 120 can be rotated and translated with respect to the base portion 110 such that at least a portion of the input device region 112 is covered. For example, when in a closed configuration (with the display 122 facing towards or facing away from the base portion 110), the display portion 120 can be configured to cover at least a portion of the input device region 112 (so that the portion of the input device region 112 is not readily accessible to a user of the computing device 100).

In some embodiments, various components (e.g., one or more input devices included in the input device region 112) of the computing device 100 can be activated (e.g., changed to an active/on state or operational state) or deactivated (e.g., changed to a deactivated/off state or standby state) when the display portion 120 is moved between various translational positions and/or rotational positions with respect to the base portion 110. For example, an input device included in the input device region 112 may be changed from a deactivated state to an activated state when the computing device 100 is changed from a first configuration to a second configuration.

As shown in FIG. 1, the computing device 100 can be a personal computing laptop-type device. In some embodiments, the computing device 100 can be any type of computing device. The computing device 100 can be, for example, a wired device and/or a wireless device (e.g., wi-fi enabled device) and can be, for example, a computing entity (e.g., a personal computing device), a server device (e.g., a web server), a mobile phone, a personal digital assistant (PDA), an e-book device, and/or so forth. The computing device 100 can be configured to operate based on one or more platforms (e.g., one or more similar or different platforms) that can include one or more types of hardware, software, firmware, operating systems, runtime libraries, and/or so forth. More details related to various configurations of a computing device that has a display portion configured to move with respect to a base portion are described in connection with the figures below.

FIGS. 2A through 2G are diagrams that illustrate a computing device 200 in various configurations. The computing device 200 can be similar to the computing device 100 shown in FIG. 1.

Figure 2A:
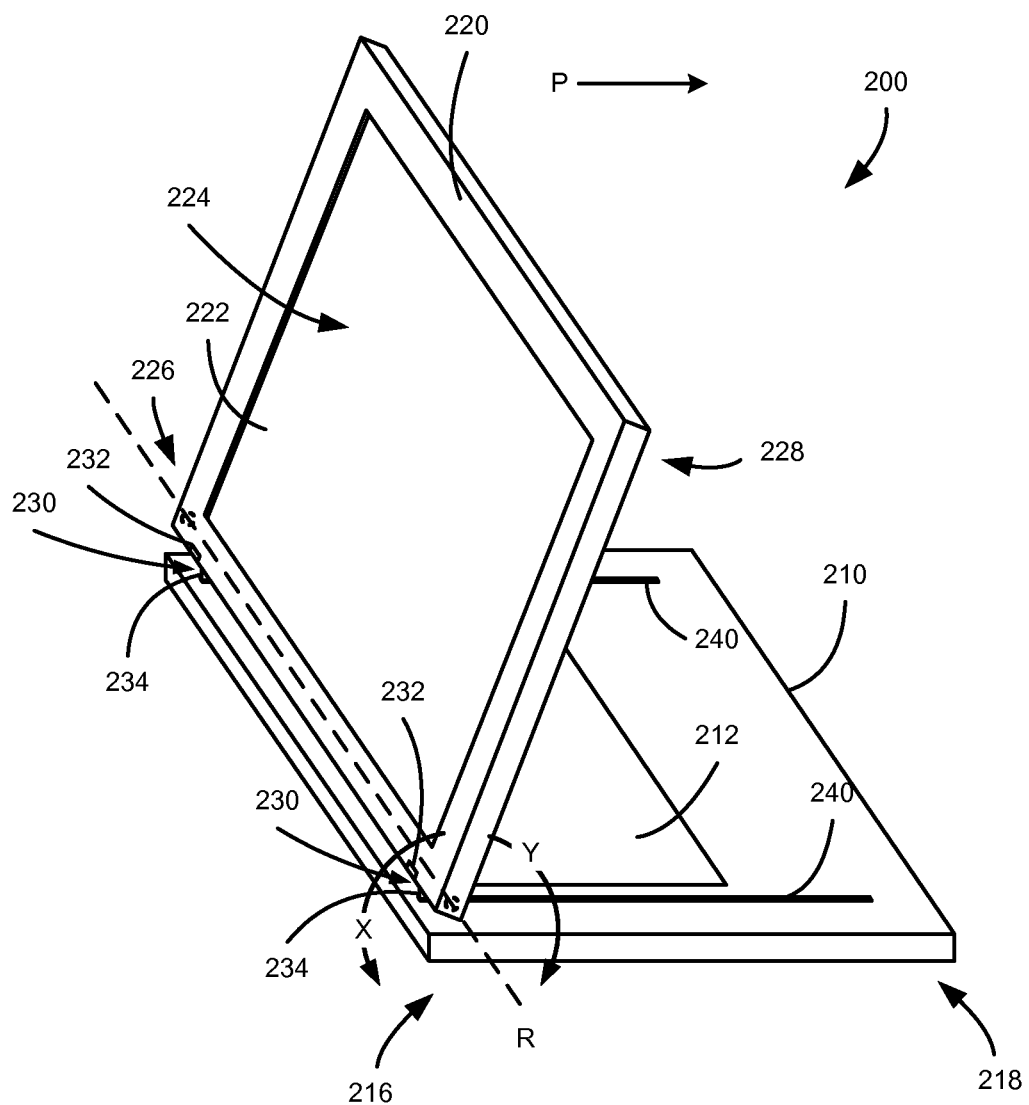
FIG. 2A is a diagram that illustrates a computing device including a base portion and a display portion operably coupled to the base portion.

FIG. 2A is a diagram that illustrates a computing device 200 including a base portion 210 and a display portion 220 operably coupled to the base portion 210. Specifically, a bottom portion 226 of the display portion 220 is coupled to the base portion 210 via two connectors 230 (which can be included in, or can be part of, a hinge). The display portion 220 also has a top portion 228 on an end of the display portion 220 that is opposite the bottom portion 226. The base portion 210 has a front portion at a front end 216, and has a back portion at a back end 218 of the base portion 210. In this embodiment, a distal direction is towards the back end 218 of the base portion 210, and a proximal direction is towards the front end 216 of the base portion 210. Accordingly, the front end 216 can also be referred to as a proximal end of the base portion 210, and the back end 218 can be referred to as a distal end of the base portion 210.

The display portion 220 is configured to rotate about an axis R of the bottom portion 226 of the display portion 220 via hinge portions 232 of the connectors 230 when in the configuration shown in FIG. 2A. In this embodiment, the display portion 220 is configured to rotate about the axis R in a clockwise direction Y or in a counterclockwise direction X as shown in FIG. 2A. Thus, the display portion 220 can be configured to rotate between various rotational positions about the axis R.

In some embodiments, the display portion 220 can have a hinge portion (on a bottom portion 226 of the display portion 220) operably coupled to each of the hinge portions 232 of the connectors 230. In some embodiments, a hinge portion of the display portion 220 and a hinge portion 232 of a connector 230 can collectively define a hinge. In some embodiments, a hinge portion of (or attached to) the display portion 220 and a hinge portion 232 of a connector 230 can collectively define a hinge.

The display portion 220 is also configured to translate with respect to the base portion 210 in direction P (which can be referred to as translational direction P) along guides 240. Specifically, translation of the display portion 220 along the guides 240 is performed via sliding portions 234 of the connectors 230, which are each coupled to one of the guides 240. When moved in direction P, the display portion 220 is moved in a backward direction (i.e., a distal direction) with respect to the base portion 210 towards the back end 218 of the base portion 210. Thus, the display portion 220 can be configured to move between various translational positions along the base portion 210 (such as the configurations shown in FIGS. 2C and 2D). As shown in FIG. 2A, the direction P, which can be characterized as a translational direction, is orthogonal to (e.g., substantially orthogonal to) the axis R. Also, the axis R can be orthogonal to a longitudinal axis of (or line aligned along) one or more of the guides 240.

In some embodiments, one or more of the guides 240 can be, or can include, a slot or groove into which the sliding portions 234 of the connectors 230 can be inserted and slidably moved. In some embodiments, one or more detents can be included along one or more of the guides 240. In some embodiments, one or more of the guides 240 can include a member (e.g., a rod) along which one or more of the sliding portions 234 can slidably move. In some embodiments, at least a portion of one or more of the sliding portions 234 can be disposed around (e.g., at least partially around), or otherwise coupled to, the member. In some embodiments, one or more of the sliding portions 234 and/or one or more of the guides 240 can include rolling devices such as wheels or ball-bearings that can facilitate translational movement (e.g., facilitate relatively smooth translational movement) of the display portion 220 with respect to the base portion 210. In some embodiments, one or more input devices (e.g., a keyboard) included in the input device region 212 can have a fixed position in the base portion 210 with respect to one or more of the guides 240. A more detailed example of a connector and a guide of a computing device are shown and described in connection with FIG. 8.

As shown in FIG. 2A, the base portion 210 includes an input device region 212. The input device region 212 can include various types of input devices such as, for example, a keyboard, one or more buttons (e.g., volume control buttons, arrow buttons, power buttons, functional keys, wireless communication activation/deactivation buttons), an electrostatic touchpad (which can be associated with one or more select buttons) to control a mouse cursor, etc.

The display portion 220 includes a touch sensitive display 222 that has a display surface 224. Thus, the touch sensitive display 222 can function as an input device. For example, the touch sensitive display 222 can be configured to display a virtual keyboard (e.g., emulate a keyboard) that can be used by a user as an input device.

In some embodiments, the configuration of the computing device 200 shown in FIG. 2A can be referred to as an easel configuration (or as an easel mode). This configuration can be referred to as the easel configuration because the display portion 220 is supported on the base portion 210 similar to a canvas on an easel.

As shown in FIG. 2A, the bottom portion 226 of the display portion 220 is in front of (i.e., proximal to) the input device region 212. Thus, if the input device region 212 includes a keyboard, the bottom portion 226 of the display portion 220 will be proximal to the keyboard. In some embodiments, the input device region 212 can be oriented within the base portion 210 so that the bottom portion 226 of the display portion 220 is disposed over at least a portion of the input device region 212 when the computing device 200 is in the easel configuration.

In some embodiments, the touch sensitive display 222 can be the primary input device of the computing device 200 when the computing device 200 is in the easel configuration. In some embodiments, when the computing device 200 is in the easel configuration, one or more input devices included in the input device region 212 can be deactivated (e.g., disabled, changed to a non-operational state, changed to a standby state). For example, a keyboard included in the input device region 212 can be automatically deactivated when the computing device 200 is in (or moved to) the easel configuration.

In some embodiments, one or more input devices included in the input device region 212, if automatically deactivated when the computing device 200 is in (or moved to) the easel configuration, can be manually activated when the computing device 200 is in the easel configuration. In some embodiments, one or more input devices included in the input device region 212 can remain active (e.g., enabled, remain in an active state, remain in an operational state) when the computing device 200 is in the easel configuration. In some embodiments, the functionality of one or more components of the computing device 200 when in the easel configuration (or any other configuration), such as the touch screen capability of the touch sensitive display 222, can be pre-set in a configuration file such as that shown in FIG. 3B.

In some embodiments, the guides 240 can be a different length (e.g., a shorter length, a longer length) than shown in FIG. 2A. For example, one or more of the guides 240 can extend across the entire, or nearly the entire, base portion 210 of the computing device 200. In such embodiments, the display portion 220 can be configured to translate from one end of the base portion 210 to the other end of the base portion 210 via the guides 240 that extend from one end of the base portion 210 to the other end of the base portion 210. For example, one or more of the guides 240 can have a length that is less than half of the base portion 210 of the computing device 200. In such embodiments, the display portion 220 may only translate across less than half of the base portion 210 of the computing device 200.

Although not shown, in some embodiments, the base portion 210 can include various computing components such as one or more processors, a graphics processor, a motherboard, a memory (e.g., a disk drive, a solid-state drive), and/or so forth. One or more images displayed on the touch sensitive display 222 can be triggered by the computing components included in the base portion 210. In some embodiments, one or more wires configured to handle signaling (e.g., video signals, signals generated in response to interactions with the touch sensitive display 222) between the touch sensitive display 222 and the base portion 210 can be associated with one or more of the connectors 230 and/or guides 240. For example, one or more wires configured to transfer signals between the base portion 210 (e.g., a processor included in the base portion 210) and the touch sensitive display 222 can be disposed inside of one or more of the connectors 230.

Although not shown in FIG. 2A, in some embodiments, the bottom portion 226 of the display portion 220 may not be at (or near) the front edge of the base portion 210 when the computing device 200 is in the easel configuration. Instead, the bottom portion 226 of the display portion 220 may be set back from the front end 216 of the base portion 210 when in the computing device 200 is in the easel configuration. Thus, the easel configuration can be defined so that the bottom portion 226 of the display portion 220 is disposed over at least a portion of the input device region 212 when the computing device 200 is in the easel configuration. In such embodiments, one or more of the guides 240 can have a length that is defined so that the display portion 220 may not be translated to a position where the bottom portion 226 of the display portion 220 is at or near the front end 216 of the base portion 210 as shown in FIG. 2A.

Figure 2B:
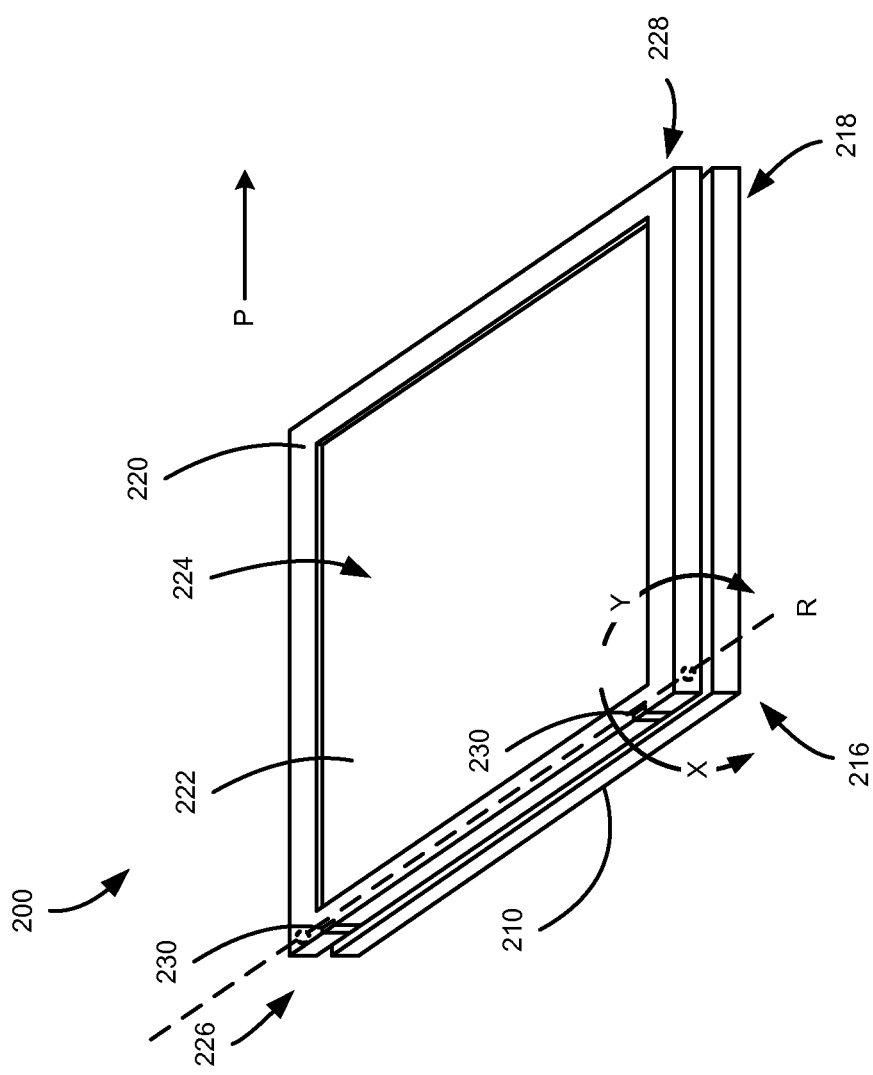
FIG. 2B is a diagram that illustrates the computing device shown in FIG. 2A in a tablet configuration.

FIG. 2B is a diagram that illustrates the computing device 200 shown in FIG. 2A in a tablet configuration. The display portion 220 shown in FIG. 2A can be rotated in the clockwise direction Y until the display portion 220 is parallel to the base portion 210 (or substantially parallel) and the display surface 224 is facing away from the base portion 210 as shown in the tablet configuration in FIG. 2B. Thus, the display portion 220 and the base portion 210 can be aligned along a common plane (or different planes that are parallel (or substantially parallel) to one another) with the display surface 224 facing away from the base portion 210. As shown in FIG. 2B, the display surface 224 is accessible when the computing device 200 is in the tablet configuration. In some embodiments, the display portion 220 can be configured to rotate in the counterclockwise direction X from the tablet configuration shown in FIG. 2B to the easel configuration shown in FIG. 2A.

The touch sensitive display 222 can be the primary input device of the computing device 200 when the computing device 200 is in the tablet configuration. In some embodiments, when the computing device 200 is in the tablet configuration, one or more input devices included in the input device region 212 (which is not visible in FIG. 2B because the input device region 212 is covered by the display portion 220) can be deactivated (e.g., disabled, changed to a non-operational state, changed to a standby state). For example, a keyboard included in the input device region 212 can be automatically deactivated (or changed to a deactivated state) when the computing device 200 is in (or moved to) the tablet configuration. Input devices included in the input device region 212 may be deactivated because the input devices may not be accessible when covered by the display portion 220 when the computing device 200 is in the tablet configuration shown in FIG. 2B. The input devices included in the input device region 212 can be changed to or remain in a deactivated state to, for example, save power of the computing device 200.

For example, if one or more of the input devices included in the input device region 212 are in an activated state when the computing device 200 is in a different configuration such as the easel configuration shown in FIG. 2A, the one or more input devices included in the input device region 212 can be deactivated when moved to (e.g., changed to) the tablet configuration shown in FIG. 2B. In some embodiments, if one or more of the input devices included in the input device region 212 are in a deactivated state when the computing device 200 is in a different configuration, such as the easel configuration shown in FIG. 2A, the one or more input devices included in the input device region 212 can remain in a deactivated state when the computing device 200 is moved to (e.g., changed to) the tablet configuration shown in FIG. 2B. In some embodiments, one or more input devices included in the input device region 212, if automatically deactivated (or changed to a deactivated state) when the computing device 200 is in (or changed to) the tablet configuration, can be manually activated (e.g., manually activated via the touch sensitive display 222) when the computing device 200 is in the tablet configuration.

In some embodiments, when the computing device 200 is in the tablet configuration, the display portion 220 of the computing device 200 can be translated with respect to the base portion 210 of the computing device 200. For example, the display portion 220 of the computing device 200 can be translated along direction P shown in FIG. 2B. FIGS. 2F and 2G illustrate configurations of the computing device 200 that can be produced by translating the display portion 220 with respect to the base portion 210 from the position of the display portion 220 when the computing device 200 is in the tablet configuration.

Figure 2C:
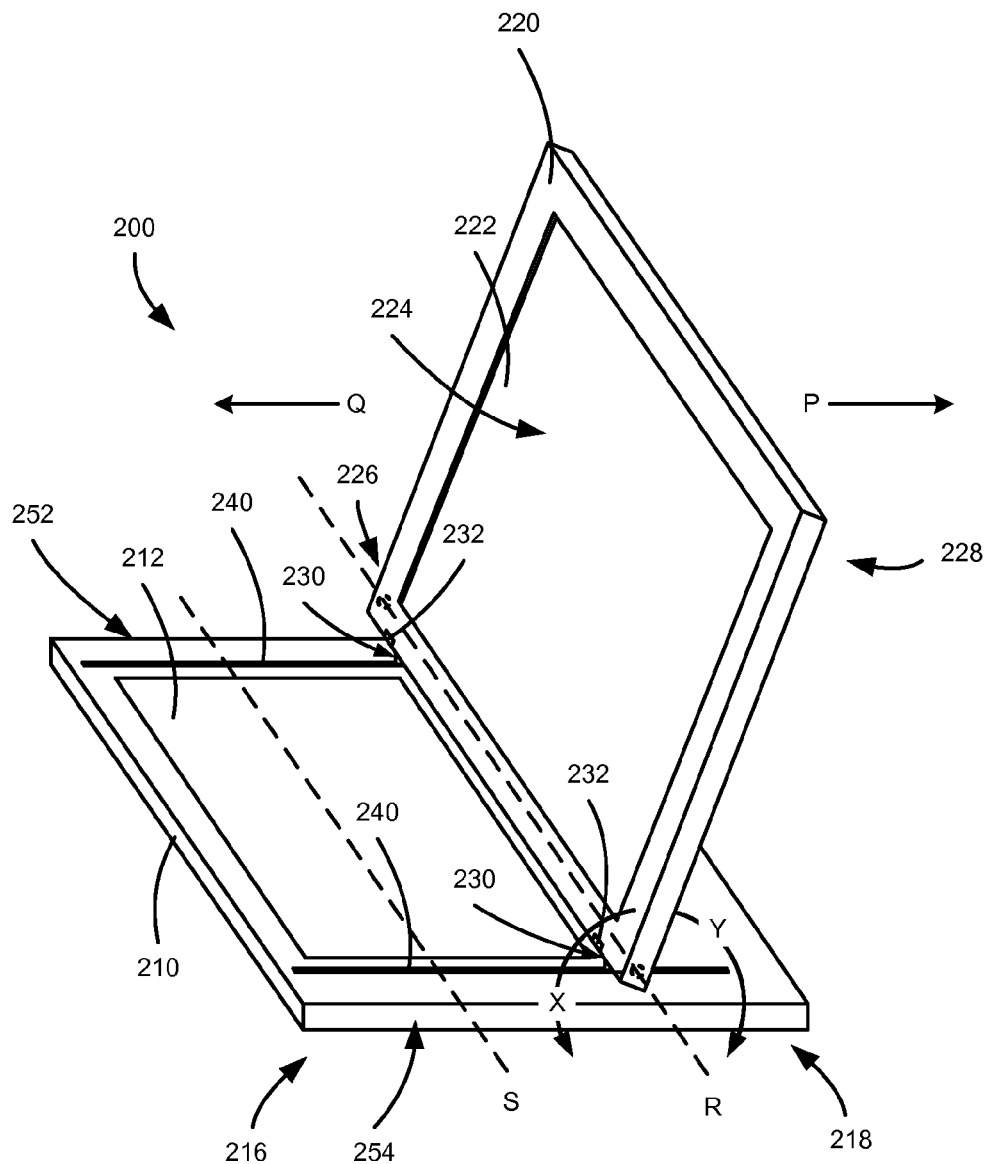
FIG. 2C is a block diagram that illustrates the computing device shown in FIG. 2A in a laptop configuration.

FIG. 2C is a block diagram that illustrates the computing device 200 shown in FIG. 2A in a laptop configuration. As shown in FIG. 2C, when the computing device 200 is in the laptop configuration, the display portion 220 of the computing device 200 is distal to the input device region 212 of the base portion 210 and a plane (e.g., primary plane) of the display portion 220 is non-parallel to a plane (e.g., primary plane) of the base portion 210. When the computing device 200 is in the laptop configuration shown in FIG. 2C, the display portion 220 can be translated along the guides 240 in direction P towards the back end 218 of the base portion 210 or translated along the guides 240 in direction Q towards the front end 216 of the base portion 210. As shown in FIG. 2C, the direction Q, which can be characterized as a translational direction, is orthogonal to (e.g., substantially orthogonal to) the axis R. Also, the axis R can be orthogonal to a longitudinal axis of (or line aligned along) one or more of the guides 240.

Although the guides 240 are shown in FIG. 2C as being approximately evenly spaced around the input device region 212 (which is centered within the base portion 210 of the computing device 200), in some embodiments, the guides 240 may not be evenly spaced around the input device region 212. In some embodiments, one or more of the guides 240 may be skewed to the left side 252 or right side 254 of the computing device 200. In some embodiments, one or more of the guides 240 may intersect (e.g., overlap with) the input device region 212.

In some embodiments, one or more input devices included in the input device region 212 can be in an activated state when the computing device 200 is in (or moved to) the laptop configuration shown in FIG. 2C. Also, in some embodiments, touch sensitivity of the touch sensitive display 222 can be in a deactivated state (or changed to a deactivated state) when the computing device 200 is in (or moved to) the laptop configuration shown in FIG. 2C. In such embodiments, the one or more input devices included in the input device region 212 can be the primary input device(s) of the computing device 200 when the computing device 200 is in the laptop configuration. In some embodiments, if touch sensitivity of the touch sensitive display 222 is in a deactivated state (or changed to a deactivated state) when the computing device 200 is in (or moved to) the laptop configuration, touch sensitivity of the touch sensitive display 222 can be manually activated (e.g., manually activated using an input device included in the input device region 212) when the computing device 200 is in (or moved to) the laptop configuration.

In some embodiments, one or more input devices (or portions thereof) included in the input device region 212 and/or touch sensitivity of the touch sensitive display 222 can be activated automatically or deactivated automatically as the computing device 200 is being moved to the laptop configuration. For example, one or more input devices (or portions thereof) included in the input device region 212 can be activated when moved from the easel configuration shown in FIG. 2A to the laptop configuration shown in FIG. 2C (if the input device(s) (or portions thereof) are in a deactivated state when in the easel configuration). Also, touch sensitivity of the touch sensitive display 222 can be deactivated when the computing device 200 is moved from the easel configuration shown in FIG. 2A to the laptop configuration shown in FIG. 2C (if touch sensitivity of the touch sensitive display 222 is in an activated state when in the easel configuration).

In some embodiments, one or more input devices (or portions thereof) included in the input device region 212 and/or touch sensitivity of the touch sensitive display 222 can be activated or deactivated when the display portion 220 of the computing device 200 is translated along the guides 240 beyond a specified point. For example, a keyboard included in the input device region 212 can be in a deactivated state when in the easel configuration shown in FIG. 2A. The keyboard can be activated (e.g., changed from a deactivated state to an activated state) when the display portion 220 is moved from the easel configuration shown in FIG. 2A beyond point S along the guides 240 in direction P to the laptop configuration shown in FIG. 2C. Conversely, the keyboard can be deactivated (e.g., changed from a deactivated state to an activated state) when the display portion 220 is moved from the tablet configuration shown in FIG. 2C beyond point S in direction Q along the guides 240 to the easel configuration shown in FIG. 2A.

In some embodiments, for example, a switch (not shown), or other device, can be triggered to activate or deactivate one or more input devices (or portions thereof) included in the input device region 212 and/or touch sensitivity of the touch sensitive display 222 when moved between various configurations. In some embodiments, the switch can be, for example, an electronic switch, a mechanical switch (e.g., a mechanical relay), and/or so forth. In some embodiments, the switch can include one or more sensors (e.g., electrical sensors) configured to detect one or more positions of portions of the computing device 200. For example, movement to a specified point (e.g., a position at the distal end and/or a position at proximal end of one or more of the guides 240, a specified rotational position of the display portion 220 with respect to the base portion 210), beyond a location (e.g., line S), and/or so forth, can be detected using a mechanical switch that can be actuated, an electrical contact, and/or so forth. As a specific example, a switch located along line S can be triggered to activate or deactivate the keyboard when the display portion 220 is moved along the guides 240 beyond point S.

In some embodiments, multiple input devices included in the input device region 212 and/or touch sensitive capability of the touch sensitive display 222 can be activated or deactivated in a staggered fashion (e.g., a staged fashion) as the display portion 220 of the computing device 200 is translated along the guides 240. For example, a keyboard and an electrostatic touchpad device for a mouse, which are included in the input device region 212, can be in a deactivated state when in the easel configuration shown in FIG. 2A. The touch sensitivity of the touch sensitive display 222 can be in an activated state when in the easel configuration shown in FIG. 2A. The electrostatic touchpad device can be activated (e.g., changed from a deactivated state to an activated state) when the display portion 220 is moved from the easel configuration shown in FIG. 2A beyond a first point along the guides 240 in direction P to the laptop configuration shown in FIG. 2C. The keyboard can be activated (e.g., changed from a deactivated state to an activated state) and touch sensitivity of the touch sensitive display 222 can be deactivated (e.g., changed from an activated state to a deactivated state) when the display portion 220 is moved from the easel configuration shown in FIG. 2A beyond a second point (different from the first point) along the guides 240 in direction P to the laptop configuration shown in FIG. 2C.

Although not shown, in some embodiments one or more of the guides 240 can be configured to extend beyond the base portion 220. For example, the display portion 220 can be configured to translate along one or more guides configured to telescope beyond the front end 216 of the base portion 210 and/or beyond the back end 218 of the base portion 210 so that the bottom portion 226 of the display portion 220 is not disposed over the base portion 210. Thus, the bottom portion 226 of the display portion 220 can be translated (in direction Q) to a position that is proximal to the base portion 210, or translated (in direction P) to a position distal to the base portion 210.

Figure 2D:
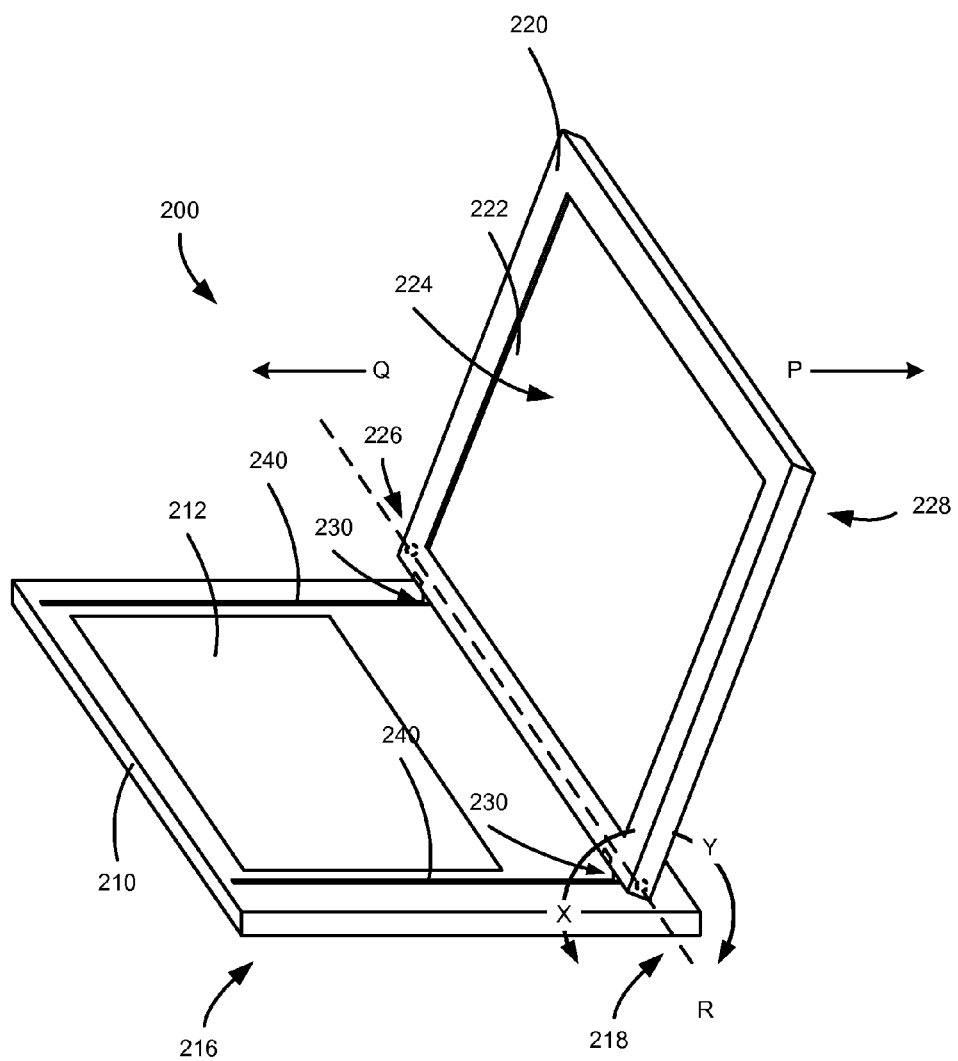
FIG. 2D is a block diagram that illustrates the computing device shown in FIG. 2A in another laptop configuration.

FIG. 2D is a block diagram that illustrates the computing device 200 shown in FIG. 2A in another laptop configuration. In the laptop configuration shown in FIG. 2D, the display portion 220 of the computing device 200 is moved to the distal ends of the guides 240 included in the base portion 210. The display portion 220 of the computing device 200 can be moved along the guides 240 in direction P from the laptop configuration shown in FIG. 2C to the laptop configuration shown in FIG. 2D. In this embodiment, because the display portion 220 of the computing device 200 is moved to the distal ends of the guides 240 included in the base portion 210, the display portion 220 cannot be moved further in direction P. However, the display portion 220 can be moved in direction Q along the guides 240 towards the front end 216 (i.e., proximal end) of the base portion 210 of the computing device 200.

The display portion 220 can be configured to rotate about the axis R of the bottom portion 226 of the display portion 220 via hinge portions 232 of the connectors 230 when in the computing device 200 is in either of the laptop configurations shown in FIG. 2C and FIG. 2D. Specifically, the display portion 220 can be configured to rotate about the axis R in the clockwise direction Y or in the counterclockwise direction X as shown in FIG. 2A. Thus, the display portion 220 can be configured to rotate between various rotational positions about the axis R.

In some embodiments, the display portion 220 may not be configured to freely rotate about an axis R when the computing device 200 is in either of the laptop configurations shown in FIG. 2C and FIG. 2D and/or the easel configuration shown in FIG. 2A. For example, in some embodiments, the display portion 220 may be locked in a particular rotational position with respect to the base portion 210 when in the easel configuration. In come embodiments, the display portion 220 can be configured to be removably locked in (e.g., detented in) one or more rotational positions (such as the angled rotational position with respect to the base portion 210 of the computing device 200 shown in FIG. 2D).

Similar to the laptop configuration shown in FIG. 2C, one or more input devices (or portions thereof) included in the input device region 212 and/or touch sensitivity of the touch sensitive display 222 can be activated automatically or deactivated automatically as the computing device 200 is being moved to the laptop configuration shown in FIG. 2D. For example, one or more input devices included in the input device region 212 can be activated and/or deactivated when moved from the laptop configuration shown in FIG. 2C and/or the easel configuration shown in FIG. 2A.

Figure 2E:
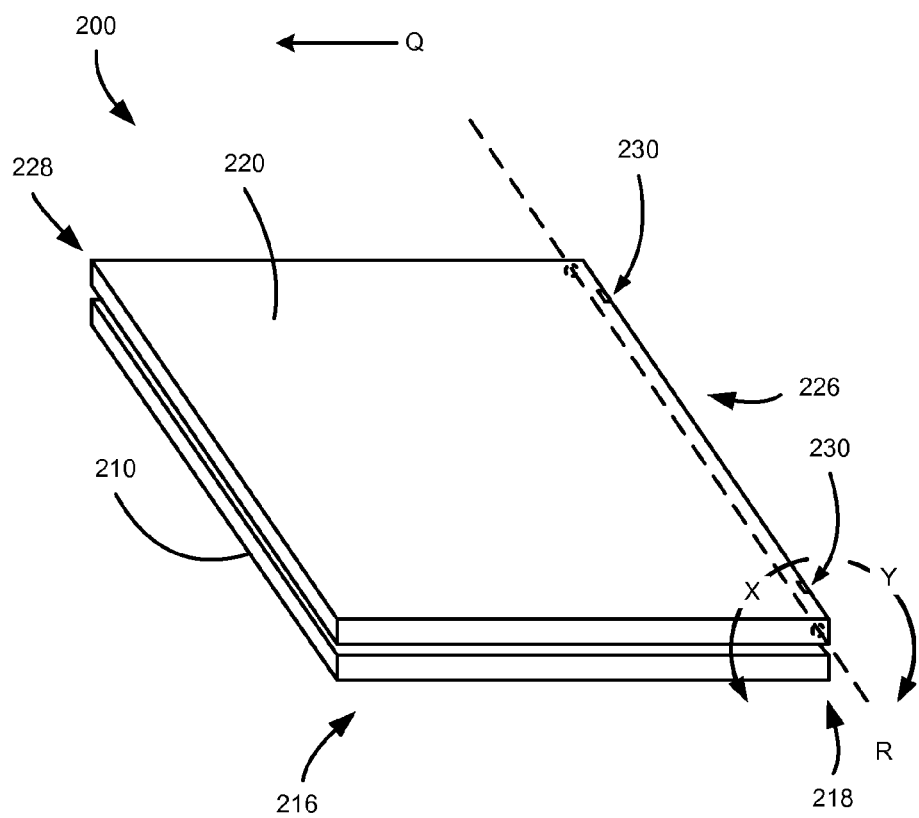
FIG. 2E is a diagram that illustrates the computing device in FIG. 2A in a closed configuration.
Figure 2F:
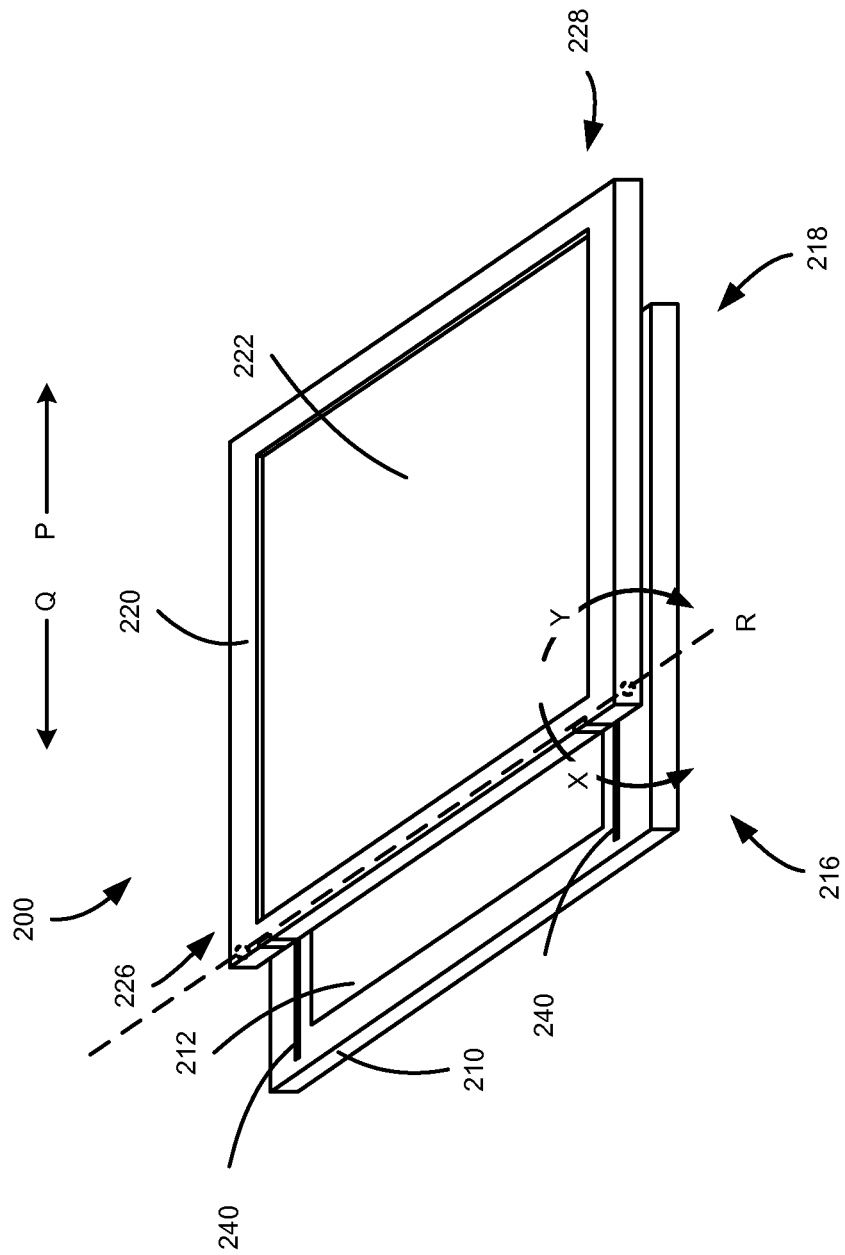
FIG. 2F is a diagram that illustrates the display portion of the computing device translated from the tablet configuration shown in FIG. 2B.
Figure 2G:
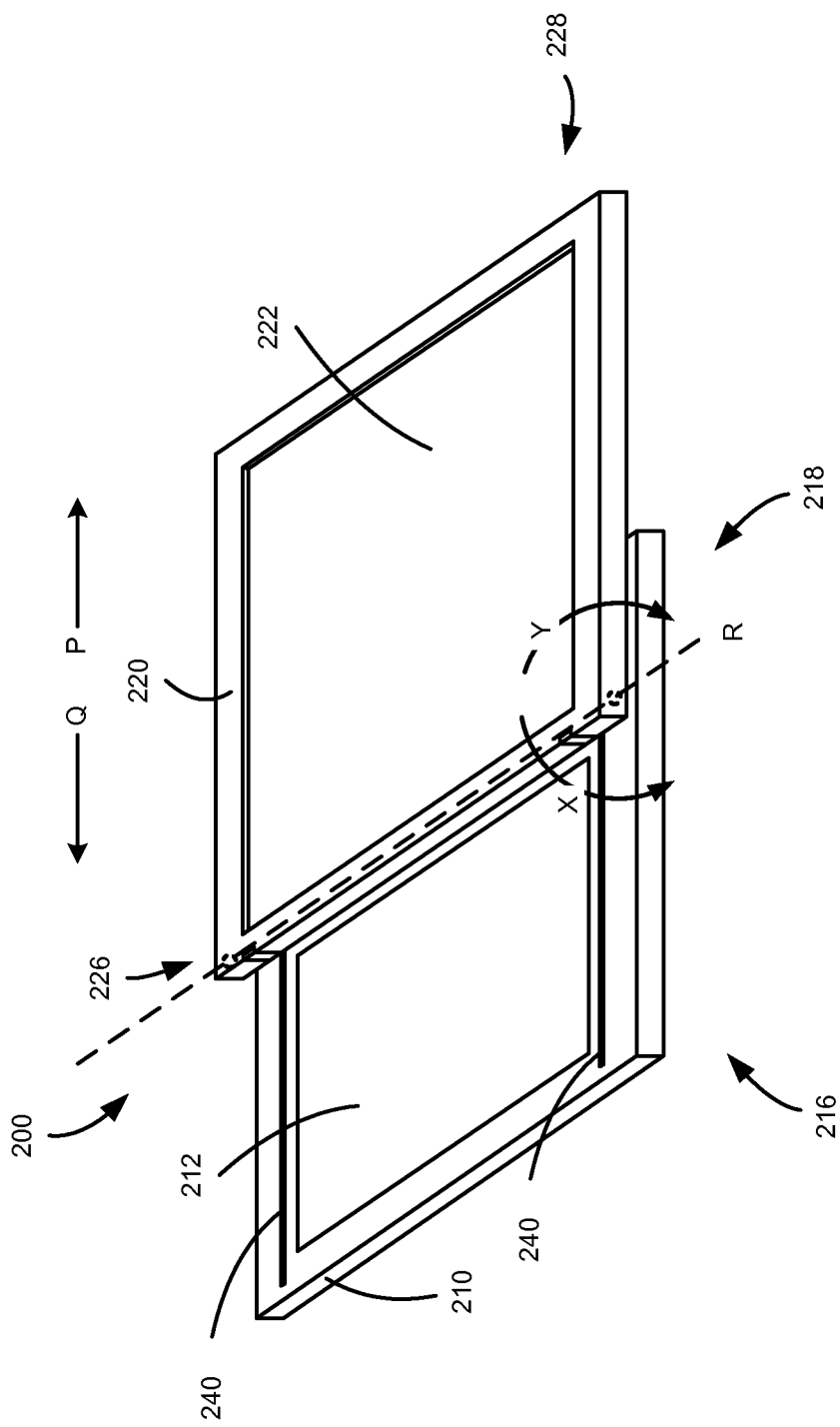
FIG. 2G is another diagram that illustrates the display portion of the computing device translated from the tablet configuration shown in FIG. 2B.

FIG. 2E is a diagram that illustrates the computing device 200 in a closed configuration. The display portion 220 shown in FIG. 2D can be rotated in the counterclockwise direction X until the display portion 220 is parallel to the base portion 210 (or substantially parallel) and the display surface 224 is facing towards the base portion 210 as shown in closed configuration shown in FIG. 2E. Thus, the display portion 220 and the base portion 210 can be aligned along a common plane (or different planes that are parallel (or substantially parallel) to one another) with the display surface 224 facing towards the base portion 210. The display surface 224 (shown in FIG. 2D and not visible in FIG. 2E) is not accessible when the computing device 200 is in the closed configuration. In some embodiments, the display portion 220 can be configured to rotate in the clockwise direction Y from the closed configuration shown in FIG. 2E to the laptop configuration shown in FIG. 2D.

When in the closed configuration shown in FIG. 2E, the touch sensitive display 222 and one or more input devices included in the input device region 212 (both of which are not shown in FIG. 2E) may be deactivated (e.g., changed from an activated state to a deactivated state) because neither the touch sensitive display 222 nor any input devices included in the input device region 212 are accessible (e.g., readily accessible by a user) when the computing device 200 is in the closed configuration. In some embodiments, the entire computing device 200 (e.g., processing components of the computing device 200) can be changed to a deactivated state. In some embodiments, when the computing device 200 is moved to the closed configuration, one or more input devices included in the input device region 212 (which is not visible in FIG. 2B because the input device region 212 is covered by the display portion 220) and/or the touch sensitive display 222 can be deactivated (e.g., disabled, changed to a non-operational state, changed to a standby state). For example, a keyboard included in the input device region 212 and/or the touch sensitive display 222 can be automatically deactivated when the computing device 200 is in (or moved to) the closed configuration. Input devices included in the input device region 212 may be deactivated because the input devices may not be accessible when covered by the display portion 220 when the computing device 200 is in the closed configuration shown in FIG. 2B. The touch sensitive display 222 may be deactivated because the touch sensitive display 222 may not be accessible when the touch sensitive display 222 is facing the base portion 210 when the computing device 200 is in the closed configuration shown in FIG. 2B. The input devices included in the input device region 212 and/or the touch sensitive display 222 can be changed to or remain in a deactivated state to, for example, save power of the computing device 200.

In some embodiments, when the computing device 200 is in the closed configuration, the display portion 220 of the computing device 200 can be translated with respect to the base portion 210 of the computing device 200. For example, the display portion 220 of the computing device 200 can be translated along the guides 240 (not shown in FIG. 2E) in direction Q.

In some embodiments, the display portion 220 of the computing device 200 can be coupled (e.g., releasably coupled) to the base portion 210 of the computing device 200 so that the display portion 220 may not be rotated with respect to the base portion 210 when the computing device 200 is in the tablet configuration shown in FIG. 2B and/or in the closed configuration shown in FIG. 2E. For example, the top portion 228 of the display portion 220 of the computing device 200 can be releasably coupled to the base portion 210 (e.g., a front end 216 of the base portion 210, the back end 218 of the base portion 210) of the computing device 200 when in the tablet configuration shown in FIG. 2B and/or in the closed configuration shown in FIG. 2E.

Although not shown, for example, a latch (or similar device) can be attached to the top portion 228 of the display portion 220. When the computing device is moved to the closed configuration shown in FIG. 2E, the latch can be coupled (e.g., releasably coupled) to the front end 216 of the base portion 210 of the computing device 200 so that the display portion 220 may not be rotated (e.g., inadvertently rotated) with respect to the base portion 210 in the clockwise direction Y. In some embodiments, the latch can be configured so that the display portion 220 may be rotated when the latch is released. In some embodiments, the latch can also be configured (e.g., configured as a reversible latch, configured as a two-sided latch) so that when the computing device is moved to the tablet configuration shown in FIG. 2B, the latch can be coupled (e.g., releasably coupled) to the back end 218 of the base portion 210 of the computing device 200 so that the display portion 220 may not be rotated (e.g., inadvertently rotated) with respect to the base portion 210 in the counter-clockwise direction X. In some embodiments, a latch can be used to couple the top portion 228 of the display portion 220 to the front end 216 of the base portion 210 when the computing device 200 is in the closed configuration, and a separate latch can be used to couple the top portion 228 of the display portion 220 to the back end 216 of the base portion 210 when the computing device 200 is in the tablet configuration.

FIG. 2F is a diagram that illustrates the display portion 220 of the computing device 200 translated from the tablet configuration shown in FIG. 2B. The display portion 220, when the computing device 200 is in the tablet configuration shown in FIG. 2B, can be translated along the guides 240 in the direction P so that at least a portion of top portion 228 of the display portion 220 is no longer disposed over the base portion 210 of the computing device 200 as shown in FIG. 2F. In this embodiment, when the display portion 220 is translated along the guides 240 in the direction P, at least a portion of the input device region 212 is exposed. In some embodiments, the display portion 220 can be translated along the guides 240 in direction Q from the configuration shown in FIG. 2F to the tablet configuration shown in FIG. 2B.

In some embodiments, one or more input devices included in the input device region 212 and that are exposed can be placed into an activated state (e.g., changed to an activated state if in a deactivated state) when the display portion 220 of the computing device 200 is translated from the tablet configuration to the configuration shown in FIG. 2F. In some embodiments, only input devices that are exposed when the display portion 220 of the computing device 200 is translated may be activated. In some embodiments, the computing device 200 can be configured so that if an exposed input device included in the input device region 212 is not activated, the exposed input device can be manually activated (e.g., manually activated using the touch sensitive display 222). Also, in some embodiments, the touch sensitive capability of the touch sensitive display 222 can be in a deactivated state (or changed to a deactivated state) when the computing device 200 is in (or moved to) the configuration shown in FIG. 2F. In some embodiments, the exposed input device (which may typically function as a secondary input device) can be activated so that the need to use the touch sensitive display 222 (which may typically function as a primary input device) as an input device may be obviated (and/or deactivated). In such embodiments, the full screen of the touch sensitive display 222 may be viewed without being obscured by a finger of a user to control content rendered on the touch sensitive display 222 because the exposed input device will be used for such control.

As a specific example, an electrostatic touchpad included in the input device region 212 can be activated when exposed by movement of the display portion 220 to the configuration shown in FIG. 2F from the tablet configuration of the computing device 200 shown in FIG. 2B (if the electrostatic touchpad is in a deactivated state when the computing device 200 is in the tablet configuration). Also, touch sensitivity of the touch sensitive display 222 can be deactivated when the computing device 200 is moved from the tablet configuration shown in FIG. 2B to the configuration shown in FIG. 2F (if the touch sensitive capabilities of the touch sensitive display 222 are in an activated state when the computing device 220 is in the tablet configuration).

Similar to the functionality described in connection with FIG. 2C, in some embodiments, one or more input devices (or portions thereof) included in the input device region 212 and/or touch sensitivity of the touch sensitive display 222 can be activated or deactivated when the display portion 220 of the computing device 200 is translated along the guides 240 beyond a specified point. Also, in some embodiments, multiple input devices included in the input device region 212 and/or touch sensitivity of the touch sensitive display 222 can be activated or deactivated in a staggered fashion as the display portion 220 of the computing device 200 is translated along the guides 240.

In some embodiments, the computing device 200 can be moved to the configuration shown in FIG. 2F from a configuration other than the tablet configuration shown in FIG. 2B. For example, the display portion 220 of the computing device 200 shown in FIG. 2A can be moved along the guides 240 in direction R until the bottom portion 226 of the display portion is disposed over the input device region 212 (as shown in FIG. 2F). The display portion 220 of the computing device 200 can then be rotated about the axis R in the clockwise direction Y until the computing device 200 is in the configuration shown in FIG. 2F.

FIG. 2G is another diagram that illustrates the display portion 220 of the computing device 200 translated from the tablet configuration shown in FIG. 2B. The display portion 220, when the computing device 200 is in the tablet configuration shown in FIG. 2B, can be translated along the guides 240 in the direction P so that at least a portion of top portion 228 of the display portion 220 is no longer disposed over the base portion 210 of the computing device 200 as shown in FIG. 2G. In this embodiment, when the display portion 220 is translated along the guides 240 in the direction P, the entire input device region 212 is exposed. In some embodiments, the display portion 220 can be translated along the guides 240 in direction Q from the configuration shown in FIG. 2G to the tablet configuration shown in FIG. 2B.

Similar to the functionality described in connection with FIGS. 2C and 2G, in some embodiments, one or more input devices (or portions thereof) included in the input device region 212 and/or touch sensitivity of the touch sensitive display 222 can be activated or deactivated when the display portion 220 of the computing device 200 is translated along the guides 240 beyond a specified point. Also, in some embodiments, multiple input devices included in the input device region 212 and/or touch sensitivity of the touch sensitive display 222 can be activated or deactivated in a staggered fashion as the display portion 220 of the computing device 200 is translated along the guides 240.

In some embodiments, the computing device 200 can be moved to the configuration shown in FIG. 2G from a configuration other than the tablet configuration shown in FIG. 2B. For example, the display portion 220 of the computing device 200 can then be rotated about the axis R in the clockwise direction Y from the configuration shown in FIG. 2C until the computing device 200 is in the configuration shown in FIG. 2F. Also, the computing device 200 can be moved to the configuration shown in FIG. 2G from the configuration shown in FIG. 2F. In such embodiments, the display portion 220 of the computing device 200 can be translated in direction P from the configuration shown in FIG. 2G until the computing device 200 is in the configuration shown in FIG. 2F.

In some embodiments, when the computing device 200 is in the configuration shown in FIG. 2G, an input device exposed within the input device region 212 can include, for example, a keyboard and/or a touchpad device (and associated selection buttons). As a specific example, when the computing device 200 is in the configuration shown in FIG. 2G, only a keyboard (and not a touchpad device) may be exposed. In such embodiments, the keyboard can be configured to rotate (e.g., mechanically rotate in a clockwise direction, mechanically rotate in a counterclockwise direction) depending on the orientation of the computing device 200 with respect to a user and/or the touch sensitive display 222. In such embodiments, if the keyboard is a virtual keyboard, the virtual keyboard can be configured to virtually rotate depending on the orientation of the computing device 200 with respect to a user and/or the touch sensitive display 222.

The display portion 220 is configured to rotate about the axis R (via the connectors 230) when in the computing device 200 is in either of the configurations shown in FIGS. 2F and 2G. Specifically, the display portion 220 is configured to rotate about the axis R in a counterclockwise direction X (but not the clockwise direction Y because the display portion 220 may be contacting the base portion 210). In some embodiments, the configuration shown in FIGS. 2F and 2G can be referred to as partial tablet configurations.

In some embodiments, portions of the computing device 200 can be removably locked (e.g., removably locked using a locking mechanism, removably locked using one or more detents) in a position with respect to other portions of the computing device 200 when in one or more of the configuration shown in FIGS. 2A through 2G. In some embodiments, the portions of the computing device 200 can be removably locked in a position with respect to another portion of the computing device 200 using, for example, a mechanical mechanism (e.g., a latch, a notch, a hook, a friction fit, a pressfit), an electronic mechanical mechanism such as an electromagnet, and/or so forth. For example, one or more of the connectors 230 can be removably locked in a position at the front end of one or more of the guides 240 when the computing device 200 is in the easel configuration shown in FIG. 2A. The one or more connectors 230 can be removably locked at the front end of the one or more guides 240 using one or more latches. Thus, the display portion 220 of the computing device 200 may not inadvertently translate (in direction P) along the guides 240 away from the easel configuration. The latch can be released so that the display portion 220 can be moved from the front end 216 of the computing device 200 when moving the computing device 200 from the easel configuration to another configuration.

Also, in some embodiments, one or more of the connectors 230 can be removably locked at one or more points along one or more of the guides 240 in any of the other configurations such as either of the laptop configurations (shown in FIGS. 2C and 2D), the tablet configuration (shown in FIG. 2B), and/or so forth. For example, the display portion 220 may be removably locked at the translational position (e.g., by locking of one or more of the connectors 230 along one or more of the guides 240) of the laptop configuration shown in FIG. 2C.

In some embodiments, the display portion 220 can also be removably locked in a rotational position (e.g., at an angled position, at a vertical position) with respect to the base portion 210. In some embodiments, for example, the display portion 220 may be removably locked at one of several rotational positions when the computing device 200 is in the laptop configuration shown in FIG. 2C.

In some embodiments, a configuration of the computing device 200 can be determined based on positions (e.g., relative positions, combinations of positions) of the physical components (e.g., display portion 220, base portion 210) of the computing device 200. For example, when the display portion 220 has a rotational position that is non-parallel with the base portion 210 (as shown in FIG. 2C) and when the bottom portion 226 of the display portion 220 has a translational position that is distal to the input device region 212 of the base portion 210 (as shown in FIG. 2C), a determination can be made that the computing device 200 is in a laptop configuration. As another example, when the display portion 220 has a rotational position that is non-parallel with the base portion 210 (as shown in FIG. 2C) and when the bottom portion 226 of the display portion 220 has a translational position that is proximal to the input device region 212 of the base portion 210 (as shown in FIG. 2C), a determination can be made that the computing device 200 is in an easel configuration.

In some embodiments, a translational position of the display portion 220 with respect to the base portion 210 of the computing device 200 can be determined based on signals from, for example, one or more electrical contacts, mechanical switches, etc. associated with (e.g., coupled to) one or more of the guides 240 along which the display portion 220 of the computing device 200 can translate. In some embodiments, a rotational position of the display portion 220 with respect to the base portion 210 of the computing device 200 can be determined based on signals from, for example, a series of electrical contacts, mechanical switches, etc. associated with (e.g., coupled to) one or more of the hinge portions 232 of the connectors 230 coupled to the display portion 220 of the computing device 200. More details related to modules configured to determine a configuration of a computing device are described in connection with the FIGS. 3A and 3B.

Although now shown, in some embodiments, the computing device 200 can be configured so that the computing device 200 may not be moved to one or more of the configurations shown in FIGS. 2A through 2G. For example, the computing device 200 can be configured so that the computing device 200 may be moved to the laptop configuration shown in FIG. 2D, but may not be moved to the closed configuration shown in FIG. 2E. In such embodiments, the connectors 230 can be configured to limit the movement of the display portion 220 along the guides 240 so that the display portion 220 can be moved to the laptop configuration shown in FIG. 2D but may not be closed. In some embodiments, the computing device 200 can be configured to change (e.g., automatically change, move) between one or more of the configurations described above using, for example, an on-screen command configured to trigger the change.

In some embodiments, one or more of the configuration of the computing device 200 shown in FIGS. 2A through 2G can be associated with a configuration file that can be defined by, for example, a user of the computing device 200. The configuration file can indicate the state (e.g., an active state, a deactivated state) of one or more portions of the computing device 200 when the computing device 200 is in a particular configuration. For example, a configuration file can indicate that when the computing device 200 is in the tablet configuration shown in FIG. 2B, the touchscreen display 222 will be the primary input device and one or more input devices included in the input device region 212 will be deactivated. The configuration file can also indicate that when the computing device 200 is changed from the tablet configuration shown in FIG. 2B to the laptop configuration shown in FIG. 2D, specified input devices included in the input device region 212 should be activated. In some embodiments, the configuration file can indicate that the specified input devices included in the input device region 212 should only be activated when the display portion 220 of the computing device 200 is locked in the laptop configuration shown in FIG. 2D.

Figures 3A, 3B:
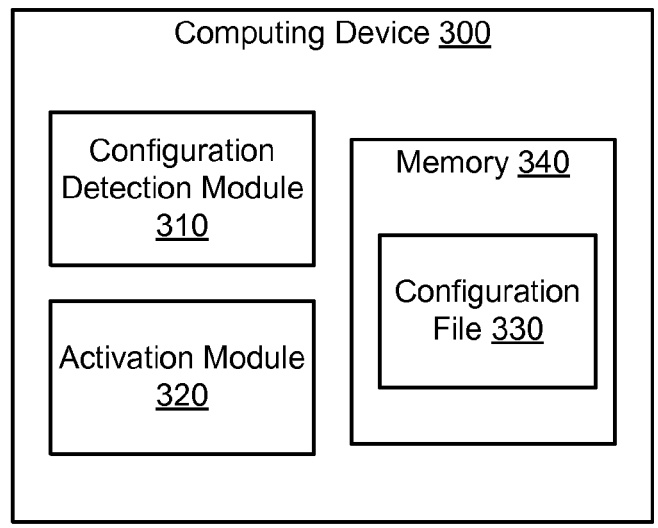
FIG. 3A is a block diagram that illustrates a configuration detection module and an activation module of a computing device.
FIG. 3B illustrates a configuration file that can be stored in the memory of the computing device shown in FIG. 3A.

FIG. 3A is a block diagram that illustrates a configuration detection module 310 and an activation module 320 of a computing device 300. Also, the computing device 300 includes a memory 340 for storing a configuration file 330. In this embodiment, physical components of the computing device 300 such as a display portion, a connector, a base portion, etc. are not shown.

The configuration detection module 310 is configured to determine that the computing device 300 is in a specified configuration. In response to the determination by the configuration detection module 310, the activation module 320 is configured to activate (e.g., change to an active/on state or operational state), or deactivate (e.g., changed to a deactivated/off state or standby state) one or more input devices based on the configuration file 330. The configuration file 330 can include information indicating which input devices should be activated or deactivated when the computing device 300 is in the specified configuration.

For example, the configuration detection module 310 can be configured to determine that the computing device 300 is in an easel configuration. The configuration detection module 310 can send an indicator that the computing device 300 is in the easel configuration to the activation module 320 (or the activation module 320 can be configured to request information about the configuration of the computing device 300). The activation module 320 can be configured to activate one or more input devices when the computing device 300 is in the easel configuration based on the indicator that the computing device 300 is in the easel configuration and based on information included in the configuration file 330. An example of a configuration file is shown in FIG. 3B.

FIG. 3B illustrates a configuration file 350 that can be stored in the memory 340 of the computing device 300 shown in FIG. 3A. As shown in FIG. 3B, the configuration file includes indicators of activation states (e.g., a deactivated state, an activated state) of input devices 370 associated with computing device configurations 360. The computing device configurations 360 include an easel configuration (e.g., easel configuration shown in FIG. 2A), a laptop1 configuration (e.g., laptop configuration shown in FIG. 2C), a laptop2 configuration (e.g., laptop configuration shown in FIG. 2D), a tablet configuration (e.g., tablet configuration shown in FIG. 2B), a closed configuration (e.g., closed configuration shown in FIG. 2E), and a partial tablet configuration (e.g., partial tablet configuration shown in FIG. 2G).

The input devices 370 include a keyboard 372, an electrostatic touchpad device 374, and a touchscreen display 376. In some embodiments, the keyboard 372 and the electrostatic touchpad device 374 can be included in an input device region of a base portion (not shown) of the computing device 300, and the touchscreen display 376 can be included in a display portion (not shown) of the computing device 300.

For example, when the computing device 300 is in the easel configuration, the configuration file 350 indicates that the keyboard 372 and electrostatic touchpad device 374 should be in a deactivated state as indicated by "OFF", and the touchscreen display 376 should be in an activated state as indicated by "ON". As another example, when the computing device 300 is in the laptop2 configuration, the configuration file 350 indicates that the keyboard 370 and electrostatic touchpad device 374 should be in an activated state as indicated by "ON", and the touchscreen display 376 should be in a deactivated state as indicated by "OFF". As yet another example, when the computing device 300 is in the tablet configuration, the configuration file 350 indicates that the keyboard 372 is "OFF", the electrostatic touchpad device 374 is "ON", and the touchscreen display 376 should be in an activated state as indicated by "ON". Although not shown, in some embodiments, when the computing device 300 is in the tablet configuration, the configuration file 350 can indicate that the keyboard 372 is "ON", the electrostatic touchpad device 374 can be "ON" or "OFF", and the touchscreen display 376 can also be "ON" or "OFF".

In some embodiments, the configuration file 350 can be a default configuration file that is stored in the memory 340 of the computing device 300. In some embodiments, one or more portions of the configuration file 350 can be defined by (e.g., customized by), for example, a user of the computing device 300. In some embodiments, the "ON" and "OFF" states can be modified from those shown in FIG. 3B. In some embodiments, the states (e.g., activated states, deactivated states) of the input device 370 when in a particular configuration can be triggered using, for example, an on-screen command configured to trigger the state (or set of states) of the input device 370.

Referring back to FIG. 3A, the configuration detection module 310 can be configured to determine that the computing device 300 is in a particular configuration based on the positions (e.g., relative positions, combinations of positions) of physical components (e.g., display portion, base portion) of the computing device 300. For example, the configuration detection module 300 can be configured to determine that the computing device 300 is in a laptop configuration when a display portion of the computing device 300 is at a translational position distal to a keyboard and when a rotational position of the display portion is non-parallel to a base portion of the computing device 300.

As mentioned previously, in some embodiments, the translational position of a display portion of the computing device 300 with respect to a base portion of the computing device 300 can be determined based on signals from, for example, a series of electrical contacts, mechanical switches, etc. associated with guides along which the display portion of the computing device 300 can translate. In some embodiments, a rotational position of a display portion of the computing device 300 with respect to a base portion of the computing device 300 can be determined based on signals from, for example, a series of electrical contacts, mechanical switches, etc. around a hinge portion coupled to the display portion of the computing device 300. In some embodiments, movement to a specified point (e.g., a position at the distal end and/or a position at proximal end of a base portion of the computing device 300, a specified rotational position of a display portion with respect to a base portion of the computing device 300), beyond a point (e.g., a point on a guide), and/or so forth, can be detected using a mechanical switch that can be actuated, an electrical contact, and/or so forth.

In some embodiments, one or more portions of the components shown in the computing device 300 in FIG. 3 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some embodiments, one or more portions of the configuration detection module 310 can be, or can include, a software module configured for execution by at least one processor (not shown). In some embodiments, the functionality of the components can be included in different modules and/or components than those shown in FIG. 3. For example, although not shown, the functionality of the configuration detection module 310 can be included in a different module than the configuration detection module 310, or divided into several different modules (not shown).

In some embodiments, the computing device 300 can be included in a network. In some embodiments, the network can include multiple computing devices (such as computing device 300) and/or multiple server devices (not shown). Also, although not shown in FIG. 3, the computing device 300 can be configured to function within various types of network environments. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can be have portions based on various protocols such as Internet Protocol (IP) and/or a proprietary protocol. The network can include at least a portion of the Internet.

Memory 340 can be any type of memory device such as a random-access memory (RAM) component or a disk drive memory. As shown in FIG. 3, the memory 340 is a local memory included in the computing device 300. Although not shown, in some embodiments, the memory 340 can be implemented as more than one memory component (e.g., more than one RAM component or disk drive memory) within the computing device 300. In some embodiments, the memory 340 can be, or can include, a non-local memory (e.g., a memory not physically included within the computing device 300) within a network (not shown). For example, the memory 340 can be, or can include, a memory shared by multiple computing devices (not shown) within a network. In some embodiments, the memory 340 can be associated with a server device (not shown) on a client side of a network and can be configured to serve several computing devices on the client side of the network.

Figure 4:
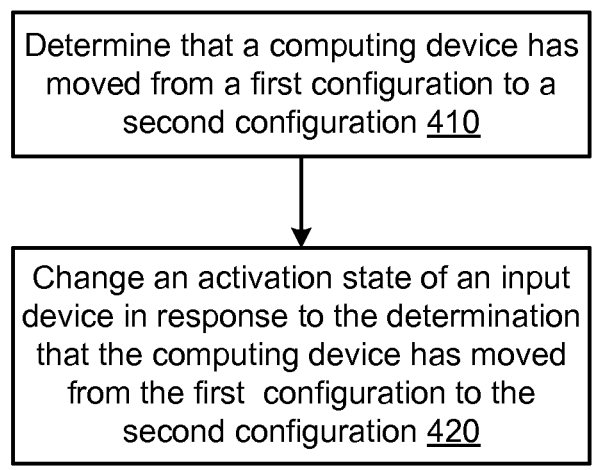
FIG. 4 is a flowchart that illustrates a method for changing the activation state of an input device of a computing device based on a configuration change of the computing device.

FIG. 4 is a flowchart that illustrates a method for changing the activation state of an input device of a computing device based on a configuration change of the computing device. In some embodiments, at least some portions of the method shown in FIG. 4 can be performed by the components of the computing device shown in FIG. 3.

As shown in FIG. 4, movement of a computing device from a first configuration to a second configuration can be determined (block 410). For example, a configuration detection module (such as configuration detection module 310 shown in FIG. 3A) can be configured to determine that the computing device has moved from a laptop configuration (e.g., laptop configuration shown in FIG. 2D) to a tablet configuration (e.g., tablet configuration shown in FIG. 2B). When in the laptop configuration, a display portion of the computing device can have a display surface nonparallel to a plane aligned along a base portion (or along a surface of an input device) of the computing device. In some embodiments, the nonparallel rotational position of the display portion with respect to the base portion of the computing device can be detected based on a signal from a switch that is actuated when the display surface is rotated until it is nonparallel to the base portion of the computing device. Also, the display portion of the computing device can have a bottom portion distal to the input device region when the computing device is in the laptop configuration. In some embodiments, the translational position of the bottom portion of the display portion of the computing device distal to the input device region can be detected based on a signal from a switch at the distal end of the input device region that is actuated when the bottom portion of the display portion is moved along a guide beyond the distal end of the input device region.

Activation state of the input device can be changed in response to the determination that the computing device is moved from the first configuration to the second configuration (block 420). For example, an input device, such as a keyboard, included in an input device region can be changed from an activated state to a deactivated state in response to the computing device changing from a laptop configuration to a tablet configuration.

The method shown in FIG. 4 can be applied to changes between various configurations. For example, an activation state of an input device, such as a keyboard, can be changed in response to the computing device changing from a tablet configuration to a laptop configuration. As another example, an activation state of an input device, such as an electrostatic touchpad device, can be changed in response to the computing device changing from a tablet configuration (e.g., tablet configuration shown in FIG. 2B) to a partial tablet configuration (e.g., partial tablet configuration shown in FIG. 2F).

Figure 5:
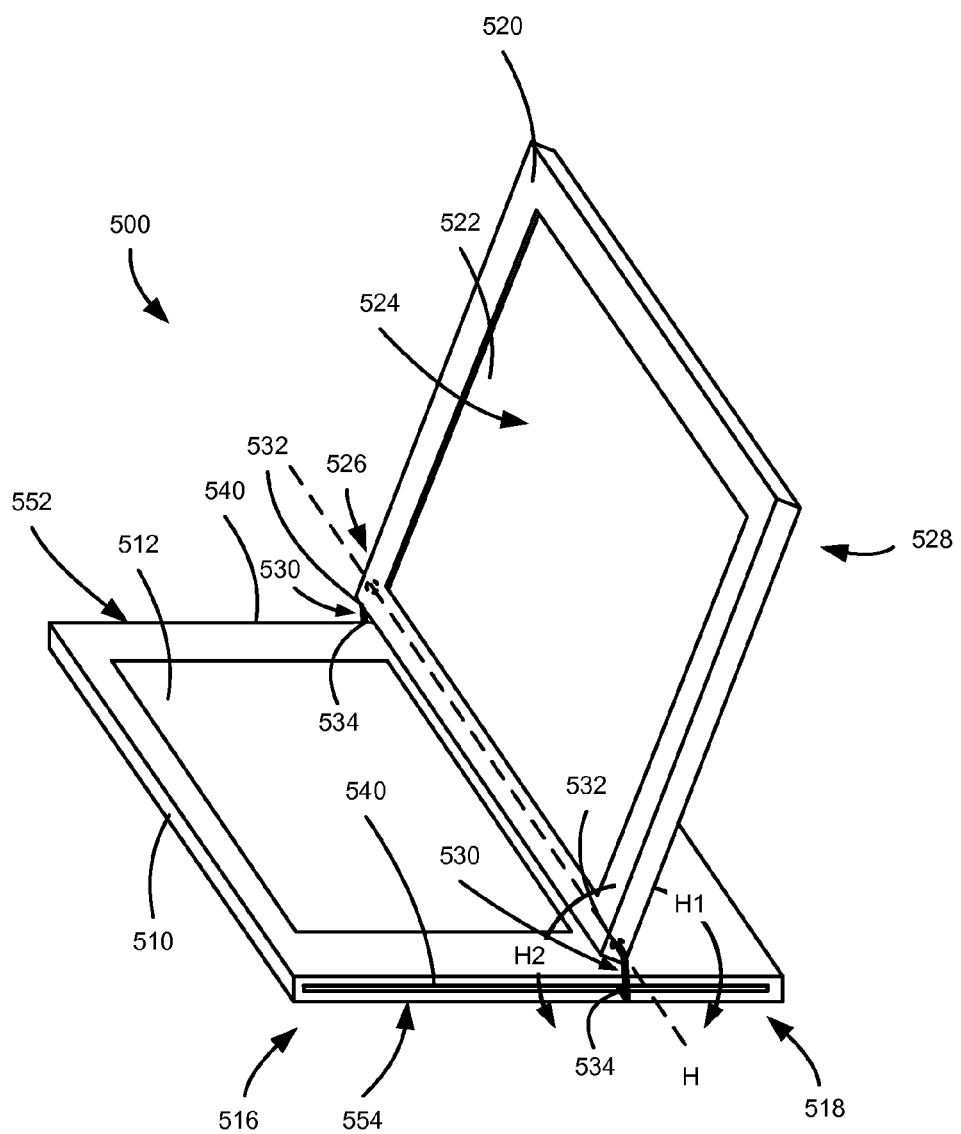
FIG. 5 is a diagram that illustrates a set of guides of a computing device.

FIG. 5 is a diagram that illustrates a set of guides 540 of a computing device 500. The computing device 500 has a base portion 510, and a display portion 520 operably coupled to the base portion 510. As shown in FIG. 5, a bottom portion 526 of the display portion 520 is coupled to the base portion 510 via two connectors 530. The display portion 520 also has a top portion 528 on an end of the display portion 520 that is opposite the bottom portion 526 of the display portion 520. The base portion 510 has a front portion at a front end 516, and has a back portion at a back end 518 of the base portion 510 of the base portion 510. In this embodiment, a distal direction is towards the back end 518 of the base portion 510, and a proximal direction is towards the front end 516 of the base portion 510.

The display portion 520 is configured to rotate about an axis H of the bottom portion 526 of the display portion 520 via hinge portions 532 of the connectors 530 when in the configuration shown in FIG. 5. In this embodiment, the display portion 520 is configured to rotate about the axis H in a clockwise direction H1 or in a counterclockwise direction H2 as shown in FIG. 5. Thus, the display portion 520 can be configured to rotate between various rotational positions about the axis H.

The display portion 520 is also configured to translate with respect to the base portion 510 in a distal direction or a proximal direction (which can each be referred to as translational directions) along guides 540. Specifically, translation of the display portion 520 along the guides 540 is performed via sliding portions 534 of the connectors 530, which are each coupled to one of the guides 540. When moved in the distal direction, the display portion 520 is moved in a backward direction with respect to the base portion 510 towards the back end 518 of the base portion 510. When moved in the proximal direction, the display portion 520 is moved in a forward direction with respect to the base portion 510 towards the front end 516 of the base portion 510. Thus, the display portion 520 can be configured to move between various translational positions along the base portion 510. As shown in FIG. 5, the distal direction and the proximal direction are orthogonal to (e.g., substantially orthogonal to) the axis H. Also, the axis H can be orthogonal to a longitudinal axis of (or line aligned along) one or more of the guides 540.

As shown in FIG. 5, guides 540 are located on a left side 552 (not visible) and a right side 554 of the base portion 510 of the computing device 500. The guides 540 shown in FIG. 5 are each facing away from the base portion 510 of the computing device 500. The guides 540 can be, or can include, a slot into which the sliding portions 534 of the connectors 530 can be inserted and slidably moved so that the display portion 520 can be translated with respect to the base portion 210 in the distal direction and/or in the proximal direction. In some embodiments, one or more of the guides 540 can include a member (e.g., a rod) along which one or more of the sliding portions 534 can slidably move. In some embodiments, at least a portion of one or more of the sliding portions 534 can be disposed around (e.g., at least partially around) the member. In some embodiments, one or more the sliding portions 534 and/or one or more of the guides 540 can include rolling devices such as wheels or ball-bearings that can facilitate translational movement of the display portion 520 with respect to the base portion 510.

As shown in FIG. 5, the base portion 510 includes an input device region 512. The input device region 512 can include various types of input devices such as, for example, a keyboard, one or more buttons, an electrostatic touchpad to control a mouse cursor, etc.

The display portion 520 includes a touch sensitive display 522 that has a display surface 524. Thus, the touch sensitive display 522 can function as an input device. For example, the touch sensitive display 522 can be configured to display a virtual keyboard (e.g., emulate a keyboard) that can be used by a user as an input device.

Figure 6:
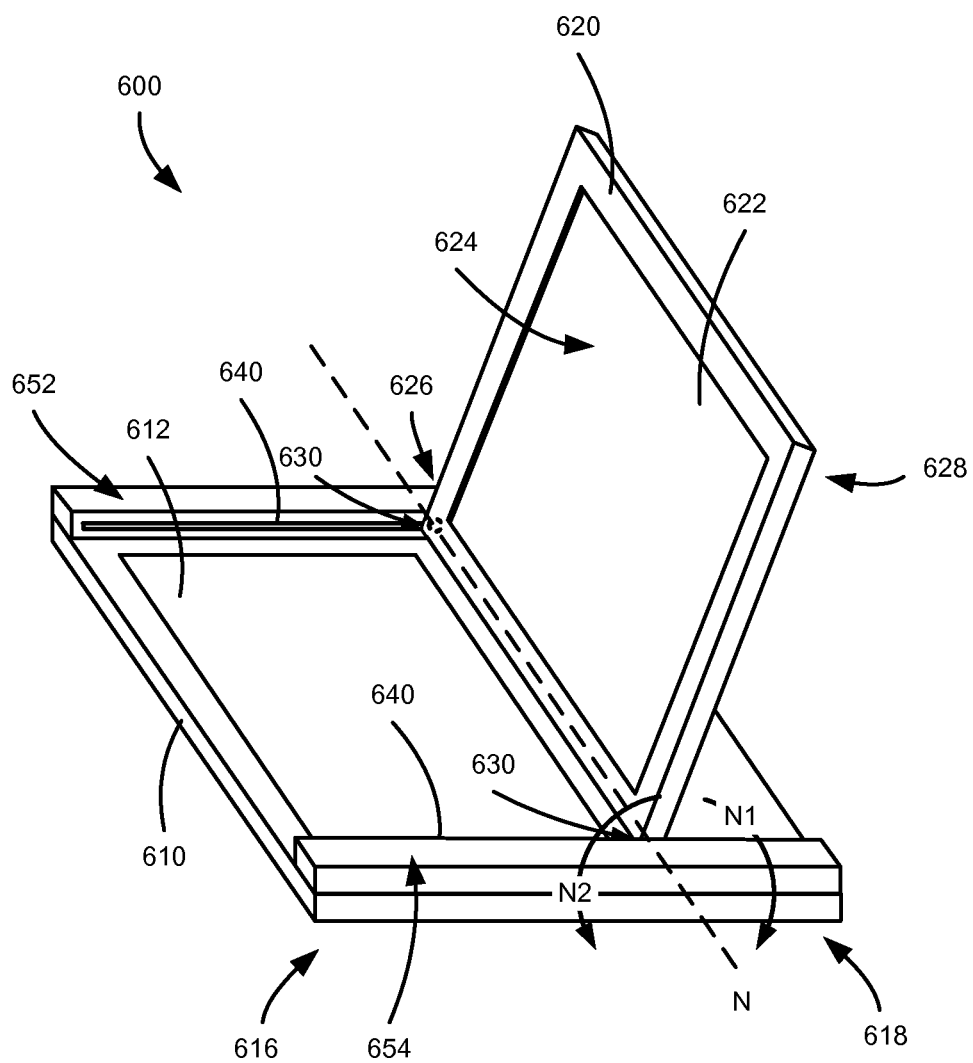
FIG. 6 is a diagram that illustrates another set of guides of a computing device.

FIG. 6 is a diagram that illustrates another set of guides 640 of a computing device 600. The computing device 600 has a base portion 610 and a display portion 620 operably coupled to the base portion 610. As shown in FIG. 6, a bottom portion 626 of the display portion 620 is coupled to the base portion 610 via two connectors 630. The display portion 620 also has a top portion 628 on an end of the display portion 620 that is opposite the bottom portion 626 of the display portion 620. The base portion 610 has a front portion at a front end 616, and has a back portion at a back end 618 of the base portion 610 of the base portion 610. In this embodiment, a distal direction is towards the back end 618 of the base portion 610, and a proximal direction is towards the front end 616 of the base portion 610.

As shown in FIG. 6, guides 640 are located on a left base member 652 and a right base member 654 of the base portion 610 of the computing device 600. In this embodiment, the guides 640 shown in FIG. 6 are facing each other. In this embodiment, the connectors 630 can each be, for example, pins that are coupled to (e.g., inserted into at least a portion of) the display portion 620 and aligned along axis N. In some embodiments, the portions of the connectors 630 disposed within the display portion 620 can be referred to as hinge portions of the connector 630. The guides 640 can be, or can include, a slot into which portions of the connectors 630 (also can be referred to as sliding portions of the connector 630) not disposed within the display portion 620 can be inserted. Accordingly, the display portion 620 can be configured to slidably translate with respect to the base portion 210 in the distal direction and/or in the proximal direction. Also, the display portion 620 can be configured to rotate about the axis N of the bottom portion 626 of the display portion 620 via the hinge portions of the connectors 630. In this embodiment, the display portion 620 can be configured to rotate about the axis N in a clockwise direction N1 or in a counterclockwise direction N2 as shown in FIG. 6. Thus, the display portion 620 can be configured to rotate between various rotational positions about the axis N.

Similar to the computing devices described above, the base portion 610 can include an input device region 612. The input device region 612 can include various types of input devices such as, for example, a keyboard, a button, an electrostatic touchpad to control a mouse cursor, etc. Also, the display portion 620 can include a touch sensitive display 622 that has a display surface 624. Thus, the touch sensitive display 622 can function as an input device. For example, the touch sensitive display 622 can be configured to display a virtual keyboard (e.g., emulate a keyboard) that can be used by a user as an input device.

Figure 7:
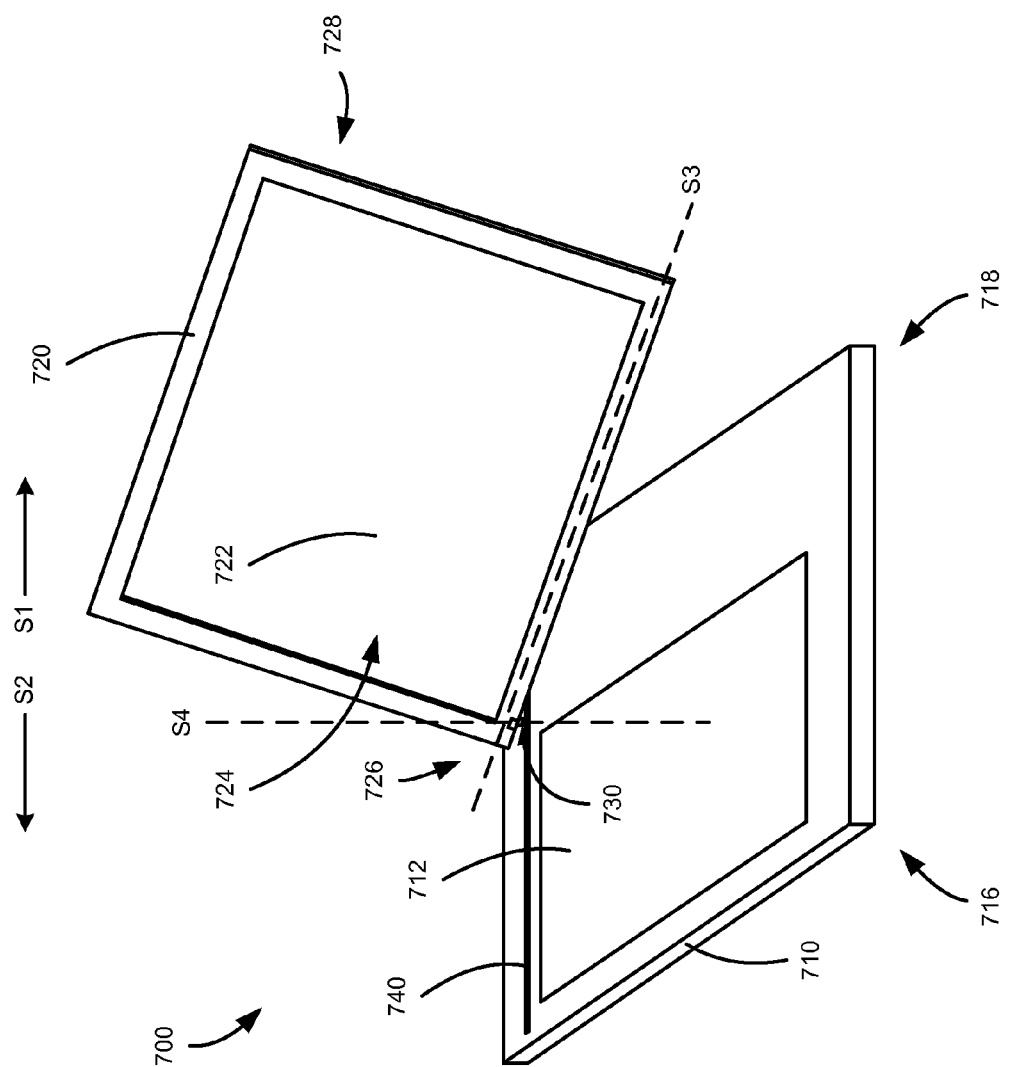
FIG. 7 is a diagram of a computing device including a base portion, a display portion, and a single guide.

FIG. 7 is a diagram of a computing device 700 including a base portion 710, a display portion 720, and a single guide 740. A bottom portion 726 of the display portion 720 is coupled to the base portion 710 via a connector 730. The display portion 720 also has a top portion 728 on an end of the display portion 720 that is opposite the bottom portion 726 of the display portion 720. The base portion 710 has a front portion at a front end 716, and has a back portion at a back end 718 of the base portion 710 of the base portion 710.

The display portion 720 is configured to slidably move along the guide 740 in a distal direction S1 towards the back end 718 of the base portion 710, and is configured to slidably move along the guide 740 in a proximal direction S2 towards the front end 716 of the base portion 710. As shown in FIG. 7, the display portion 720 is also configured to rotate about an axis S3 and configured to rotate about an axis S4. In some embodiments, the connector 730 can include a ball and socket joint that enables rotation about the axis S3 and the axis S4.

Although not shown in FIG. 7, in some embodiments, an additional guide can be included in the base portion 710 of the computing device 700. In such embodiments, the additional guide can be parallel to (or substantially parallel to) the guide 740 so that the set of guides is similar to the set of guides described in connection with the computing devices shown above. In such embodiments, the bottom portion 726 of the display portion 720 can be configured to rotate until an additional connector (not shown) on the bottom portion 726 of the display portion 720 engages with the additional guide. Thus, the display portion 720 can be configured to translate and rotate with respect to the base portion 710 (via the connector 730 and the additional connector) similar to the translation and rotation described, for example, in connection with FIGS. 2A through 2G.

Figure 8:
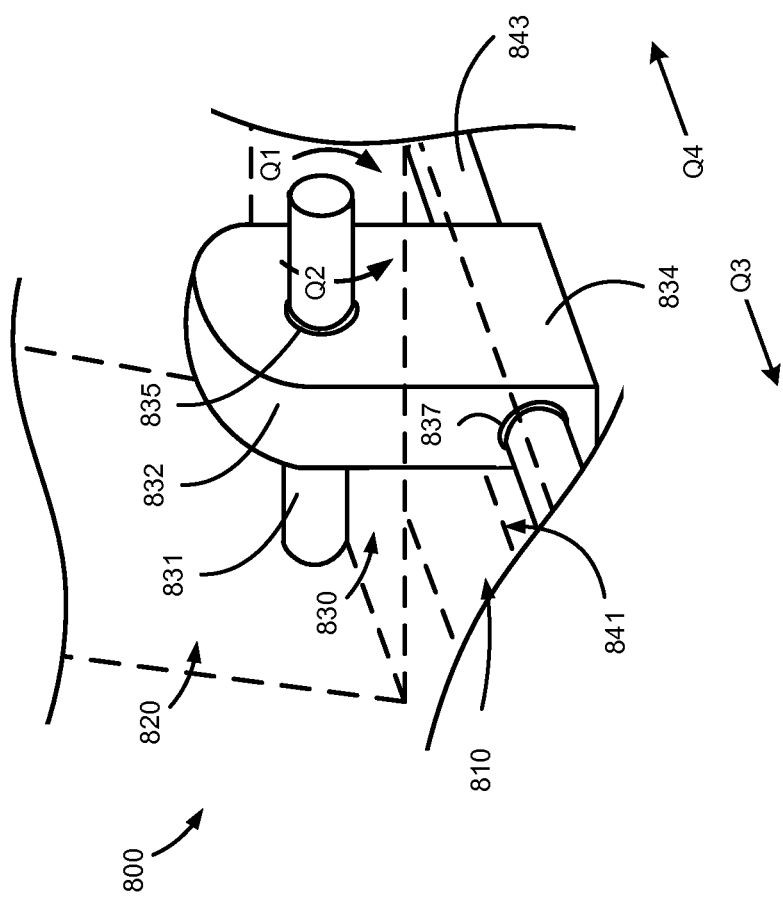
FIG. 8 is a diagram of a connector that has a hinge portion and a sliding portion of a computing device.

FIG. 8 is a diagram of a connector 830 that has a hinge portion 832 and a sliding portion 834 of a computing device 800. As shown in FIG. 8, the hinge portion 832 of the connector 830 is disposed inside of a display portion 820 (shown with dashed lines) of the computing device 800. The sliding portion 834 of the connector 130 is disposed inside of a base portion 810 (shown with dashed lines) of the computing device 800.

As shown in FIG. 8, a pin 831 (which can be referred to as a hinge portion) is embedded inside of the display portion 830 and the pin 831 of the display portion 820 is configured to rotate in a clockwise direction Q1 and a counterclockwise direction Q2 within an opening 835 in the hinge portion 832 of the connector 830. Also, in this embodiment, a rod 843 is embedded inside of the base portion 810 and the connector 830 is configured to slidably move over the rod 843 in translational direction Q4 and translational direction Q3 through a slot 841 using an opening 837 in the sliding portion 834 of the connector 830. In some embodiments, the slot 841 and the rod 843 can each or collectively be referred to as a guide. In some embodiments, one or more wires for signaling between the display portion 820 and the base portion 810 can be disposed within and/or coupled to the connector 830.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user ca provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or subcombinations of the functions, components and/or features of the different embodiments described.

What is claimed is:

1. A computing device, comprising:
a base portion including a top planar surface with an input device region included in and aligned along the top planar surface, the base portion including a raised guide having a slot partially recessed in a side of the raised guide, a depth of the slot is less than a thickness of the raised guide; and
a display portion operably coupled to the base portion and including a display, the display portion being configured to slidably move along the raised guide over the input device region of the base portion, the display including a viewable surface facing in a first direction away from the base portion when the computing device is in a tablet configuration with a primary plane of the display portion being substantially parallel to a primary plane of the base portion, the display portion being configured to cover the input device region when the computing device is in the tablet configuration,
the viewable surface of the display facing in a second direction towards the base portion when the computing device is in a closed configuration with the primary plane of the display portion being substantially parallel to the primary plane of the base portion, the display portion being configured to cover the input device region when the computing device is in the closed configuration,
the viewable surface of the display of the computing device having a rotational position non-parallel to the primary plane of the base portion when the computing device is in an easel configuration or in a laptop configuration, the display portion includes a bottom portion positioned on a front end side of the input device region when the computing device is in the easel configuration, the bottom portion of the display portion is positioned on a back end side of the input device region when the computing device is in the laptop configuration.

2. The computing device of claim 1, wherein the bottom portion of the display portion is operably coupled to the guide and configured to slidably move along the guide to move the computing device between the tablet configuration and the closed configuration.

3. The computing device of claim 1, wherein the bottom portion of the display portion is configured to slidably move over the input device region of the base portion in a translational direction orthogonal to an axis around which the display portion rotates when the computing device is moved between the tablet configuration and the closed configuration.

4. The computing device of claim 1, wherein:
the input device region is exposed when the computing device is in the laptop configuration, the input device region is in a deactivated state when the computing device is in the tablet configuration and in the closed configuration, and the input device region is in an activated state when the computing device is in the laptop configuration.

5. The computing device of claim 1, further comprising:
a connector operably coupled to the bottom portion of the display portion and to the guide, the display portion being configured to rotate about an axis passing through the connector, the bottom portion of the display portion being configured to slidably move along the guide over the input device region of the base portion in a translational direction substantially orthogonal to the axis.

6. The computing device of claim 1, wherein the bottom portion of the display portion is configured to slidably move along the guide to move the computing device between the tablet configuration and the closed configuration, the display portion being configured to rotate about an axis substantially orthogonal to a longitudinal axis of the guide to move the computing device from the tablet configuration or from the closed configuration to a laptop configuration or to the easel configuration.

7. The computing device of claim 1, wherein the display portion includes a hinge portion, the hinge portion of the display portion is positioned proximal to the input device region when the computing device is in the tablet configuration, the hinge portion of the display portion is positioned distal to the input device region when the computing device is in the closed configuration.

8. The computing device of claim 1, wherein the display portion is configured to be translated so that at least a portion of the input device region is exposed when the display portion is moved from the tablet configuration of the computing device to a partial tablet configuration, wherein the viewable surface of the display faces in the first direction away from the base portion when the computing device is in the partial tablet configuration.

9. The computing device of claim 1, further comprising:
a connector operably coupled to the display portion and operably coupled to the base portion via the guide, wherein the bottom portion of the display portion is configured to slidably move along the guide using the connector to move the computing device between the tablet configuration and the closed configuration, the connector being configured to be removably locked in a first position along the guide and to be removably locked in a second position along the guide.

10. The computing device of claim 1, wherein the computing device is configured to rotate about a hinge portion such that the viewable surface of the display of the computing device has a rotational position substantially parallel to the primary plane of the base portion when the bottom portion is distal to the input device region and when the bottom portion is proximal to the input device region.

11. The computing device of claim 1, wherein the guide is a first guide,
the computing device further comprising a second guide, the display portion configured to slidably move along the first guide and along the second guide over the input device region of the base portion.

12. The computing device of claim 1, wherein the display portion includes a connector having at least a portion disposed within the slot such that the display portion can rotate axially in relation to the base portion and slidably move along the raised guide over the input device region of the base portion.

13. A computing device, comprising:
a base portion including an input device region;
a first raised guide disposed on a top planar surface of the base portion, the first raised guide having a slot partially recessed in a side of the first raised guide, a depth of the slot is less than a thickness of the first raised guide;
a second guide disposed on the base portion with the input device region interposed between the first raised guide and the second guide;
a display portion including a display and having a bottom portion coupled to the base portion via a hinge, the display portion configured to rotate about an axis using the hinge, the bottom portion of the display portion configured to slidably move along the first raised guide and the second guide over the input device region of the base portion in a translational direction orthogonal to the axis; and
the display portion having a rotational position non-parallel to a plane aligned along the base portion when the computing device is moved over the input device region in the translation direction from a laptop configuration to an easel configuration, the bottom portion of the display portion being positioned on a front end side of the input device region when the computing device is in the easel configuration, the bottom portion of the display portion is positioned on a back end side of the input device region when the computing device is in the laptop configuration.

14. The computing device of claim 13, wherein the bottom portion of the display portion is configured to move from a first position distal to the input device region of the base portion in a translational direction orthogonal to the axis to a second position proximal to the input device region of the base portion.

15. The computing device of claim 13, wherein the display portion is configured to rotate about the axis using the hinge when the bottom portion of the display portion is disposed over the input device region included in the base portion.

16. The computing device of claim 13, wherein the display of the display portion has a viewable surface that is exposed when the computing device is in a tablet configuration, the display portion is substantially parallel to the base portion when the computing device is in the tablet configuration.

17. The computing device of claim 13, wherein:
the bottom portion of the display portion is configured to slidably move over the input device region when a viewable surface of the display is included in a plane that is non-parallel to a plane aligned along a surface of the input device region; and
the bottom portion of the display portion is configured to slidably move over the input device region when the viewable surface of the display is aligned along a plane that is non-parallel to the plane aligned along the surface of the input device region.

18. The computing device of claim 13, wherein the display portion is configured to rotate from a rotational first position to a rotational second position,
the display portion is configured to cover the input device region included in the base portion when in the rotational first position, the display has a viewable surface facing in a direction opposite the input device region when the display portion is in the first rotational position,
the display portion is configured to expose the input device region included in the base portion when in the second rotational position.

19. The computing device of claim 13, wherein the input device region is in a fixed position with respect to the first guide, the first guide being aligned along a line orthogonal to the axis.

20. The computing device of claim 13, wherein the bottom portion of the display portion is configured to move in a translational direction orthogonal to the axis from a first translational position distal to the input device region of the base portion to a second translational position proximal to the input device region of the base portion, the display portion is configured to rotate about the axis when in the first translational position and configured to rotate about the axis when in the second translational position.

21. The computing device of claim 13, wherein the bottom portion of the display portion is configured to move in a translational direction orthogonal to the axis from a first removably lockable position distal to the input device region of the base portion to a second removably lockable position proximal to the input device region of the base portion.

22. The computing device of claim 13, further comprising:

a first block portion and a second block portion disposed on the base portion with the input device region interposed between the first block portion and the second block portion, the first guide being included in the first block portion and the second guide being included in the second block portion.

23. The computing device of claim 13, wherein the hinge includes connector having at least a portion disposed within the slot such that the display portion can rotate axially in relation to the base portion and slidably move along the first raised guide over the input device region of the base portion.

\* \* \* \* \*